(12) United States Patent
Hesse

(10) Patent No.: US 10,017,278 B2
(45) Date of Patent: Jul. 10, 2018

(54) GYROSCOPIC ORBITER WITH VERTICAL TAKEOFF AND VERTICAL LANDING CAPABILITIES

(71) Applicant: Thomas Norman Hesse, Harrison Hot Springs (CA)

(72) Inventor: Thomas Norman Hesse, Harrison Hot Springs (CA)

( * ) Notice: Subject to any disclaimer, the term of this patent is extended or adjusted under 35 U.S.C. 154(b) by 505 days.

(21) Appl. No.: 15/184,186

(22) Filed: Jun. 16, 2016

(65) Prior Publication Data

US 2017/0088291 A1    Mar. 30, 2017

Related U.S. Application Data

(63) Continuation-in-part of application No. 15/063,507, filed on Mar. 7, 2016.

(60) Provisional application No. 62/128,860, filed on Mar. 5, 2015.

(51) Int. Cl.
| | |
|---|---|
| *B64G 1/00* | (2006.01) |
| *B64G 1/14* | (2006.01) |
| *B64C 29/00* | (2006.01) |
| *B64C 29/02* | (2006.01) |
| *B64C 5/06* | (2006.01) |
| *B64C 11/46* | (2006.01) |
| *B64G 1/40* | (2006.01) |

(52) U.S. Cl.
CPC .............. *B64G 1/14* (2013.01); *B64C 5/06* (2013.01); *B64C 11/46* (2013.01); *B64C 29/0033* (2013.01); *B64C 29/02* (2013.01); *B64G 1/002* (2013.01); *B64G 1/40* (2013.01)

(58) Field of Classification Search
CPC ........... B64G 1/002; B64G 1/14; B64C 11/46; B64C 29/00; B64C 29/0033; B64C 29/0008; B64C 29/0016; B64C 29/0075
See application file for complete search history.

(56) References Cited

U.S. PATENT DOCUMENTS

| | | | | |
|---|---|---|---|---|
| 6,382,556 | B1* | 5/2002 | Pham | B64C 27/28 244/6 |
| 7,150,429 | B2* | 12/2006 | Kusic | B64C 27/08 244/17.23 |
| 8,505,846 | B1* | 8/2013 | Sanders, II | B64C 29/02 244/7 A |
| 2005/0127238 | A1* | 6/2005 | Ballew | B64C 27/10 244/10 |

(Continued)

*Primary Examiner* — Richard G Davis

(57) ABSTRACT

A gyroscopic orbiter with vertical takeoff and vertical landing capabilities can transition between different functional modes while in-flight. The orbiter typically includes a fuselage, a front boom, a front propulsion unit, a rear boom, and a rear propulsion unit. The front boom is mounted at two pivot points to a bow of the fuselage by the front boom. The rear boom is mounted at two pivot points to a stern of the fuselage by the rear boom. One functional mode is the vertical takeoff and landing mode, wherein the propulsion units are oriented parallel to each other and are directed upward. Another functional mode is the shuttle mode, wherein the propulsion units are oriented at an angle with each other, and the front propulsion unit is directed forward. Another functional mode is the high speed mode, wherein the propulsion units are oriented collinear with a roll axis of the fuselage.

31 Claims, 16 Drawing Sheets

(56) References Cited

U.S. PATENT DOCUMENTS

2006/0016930 A1\* 1/2006 Pak .................. A63H 27/14
  244/12.4
2007/0158494 A1\* 7/2007 Burrage ............. B64C 29/0033
  244/7 R \* cited by examiner

GYROSCOPIC ORBITER WITH VERTICAL TAKEOFF AND VERTICAL LANDING CAPABILITIES

The current application is a continuation-in-part (CIP) application of a U.S. non-provisional application Ser. No. 15/063,507 filed on Mar. 7, 2016. The U.S. non-provisional application Ser. No. 15/063,507 claims a priority to a U.S. provisional application Ser. No. 62/128,860 filed on Mar. 5, 2016. The U.S. non-provisional application Ser. No. 15/063,507 was filed on Mar. 7, 2016 while Mar. 5, 2016 was on a weekend.

FIELD OF THE INVENTION

The present invention relates generally to an aircraft. More specifically, the present invention is an aircraft that is configurable in flight from a vertical takeoff and landing position to a streamlined position for high speed flight. Furthermore, the present invention may be used for orbital flight through the outer limits of the Earth's atmosphere and in-space.

BACKGROUND OF THE INVENTION

Vertical takeoff and landing capabilities are a widely sought after feature for aircraft. Current designs for aircraft capable of achieving vertical takeoff and landing require large amounts of petroleum-based fuel, which is neither cost-effective nor environmentally friendly. Further, vehicles designed for flight in the outer edges of the earth's atmosphere and in space are equally wasteful because such vehicles also require large amounts of fuel.

The present invention is a new class of intelligent aircraft that utilizes robotic and autonomous control to ensure safe, efficient and pollution free orbital travel. The present invention will use robust software protocols programmed into the flight control systems to ensure safe and secure transportation of occupants through any and all foreseeable mechanical failures or potentially life threatening situations. The present invention is environmentally friendly as it uses clean burning propellants and/or electric power. The efficiency and functionality of the present invention is dependent on three different configurations in which the present invention may be arranged. The preferred embodiment of the present invention comprises three configurations designed for various environments and purposes of flight. The vertical takeoff mode is used for taking off or landing the present invention without the need for a runway. The shuttle mode may be used for medium travel speeds, for transitioning between vertical takeoff or landing mode to high speed mode or for automatic self-stabilizing recovery from high altitude. The high speed mode is highly efficient and receives the least amount of drag given its aerodynamic arrangement of components. The present invention incorporates electric motor systems like regenerative rotor braking to recharge the batteries during high level descent from efficient flight altitudes or re-entry. The present invention is a durable aircraft that is designed to provide comfort, safety, and an immersive flight experience to users.

DETAILED DESCRIPTION OF THE INVENTION

All illustrations of the drawings are for the purpose of describing selected versions of the present invention and are not intended to limit the scope of the present invention.

Figure 1:
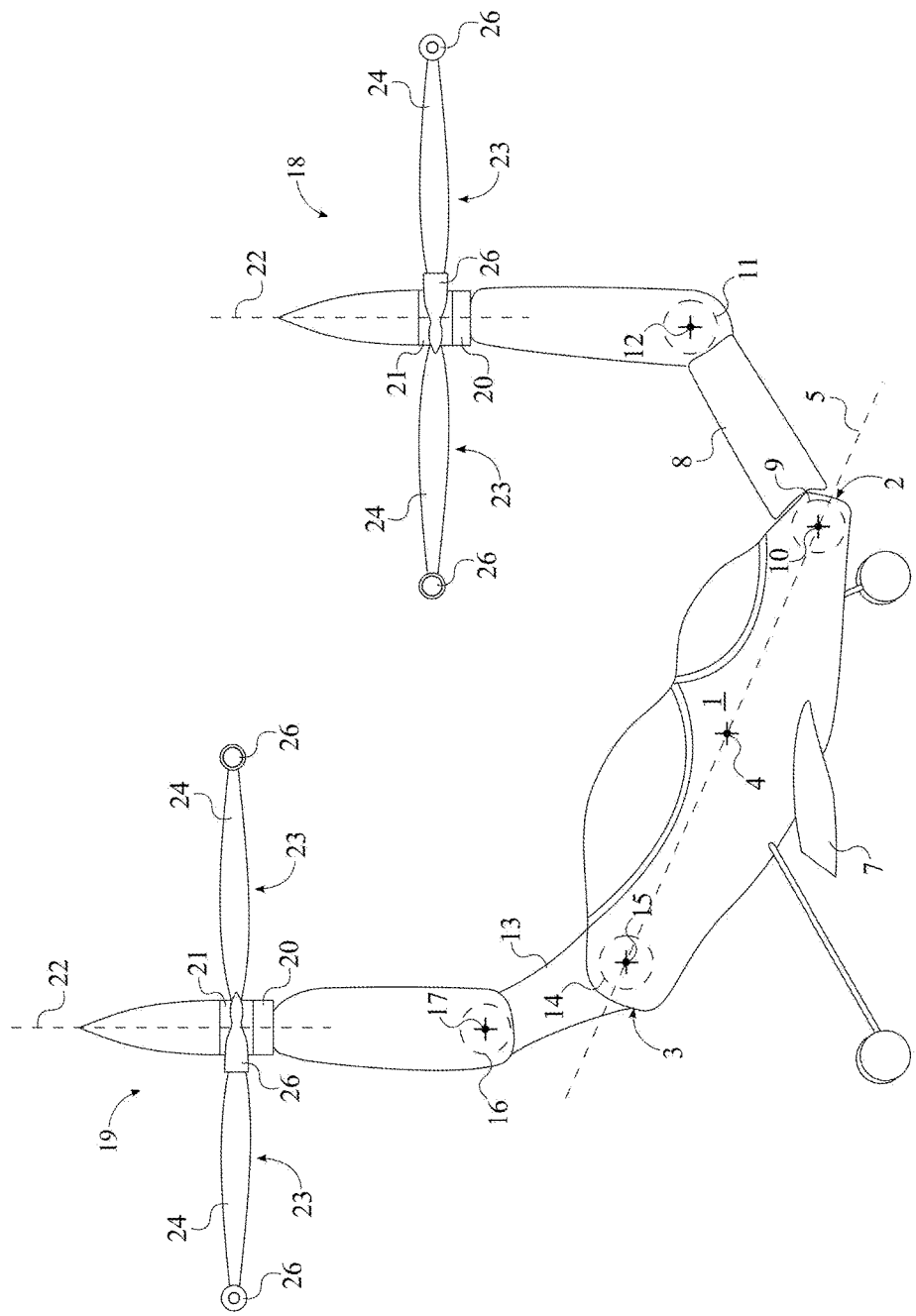
FIG. 1 is a side view of the present invention being configured into the vertical takeoff or landing (VTOL) mode, wherein the second embodiment of a stern for the present invention is configured with a rear propulsion unit.

The present invention is a gyroscopic orbiter with vertical takeoff and vertical landing capabilities and is able to structurally reconfigure itself in midflight between a vertical takeoff or landing (VTOL) mode, a shuttle mode, and a high speed mode. As can be seen in FIG. 1, the present invention comprises a fuselage 1, a front boom 8, a front proximal hinge joint 9, the front distal hinge joint 11, a front propulsion unit 18, a port lateral fin 6, and a starboard lateral fin 7. The fuselage 1 is used to house passengers and cargo and provides the present invention with a central body to connect its other components. The front propulsion unit 18 is used to generate thrust for the present invention. The front boom 8 extends the front propulsion unit 18 away from the fuselage 1 so that the front propulsion unit 18 can be reoriented without coming into contact with the fuselage 1.

The general arrangement of the front boom 8 and the front propulsion unit 18 allows the present invention to structurally reconfigure itself in midflight. The front boom 8 is mounted adjacent to a bow 2 of the fuselage 1 by the front proximal hinge joint 9, which provides the front boom 8 with one rotational degree of freedom with the fuselage 1. The front propulsion unit 18 is mounted adjacent to the front boom 8 by the front distal hinge joint 11, which also provides the front propulsion unit 18 with one rotation degree of freedom with the front boom 8. The front proximal hinge joint 9 and the front distal hinge joint 11 are positioned opposite to each other along the front boom 8 and are used to reorient the front boom 8 and the front propulsion unit 18 to their necessary positions during any of the three modes of the present invention. As a result, the rotation axis 10 of the front proximal hinge joint 9 and the rotation axis 12 of the front distal hinge joint 11 are positioned parallel to the pitch axis 4 of the fuselage 1 so that the front propulsion unit 18 can only be coincidently oriented in the Sagittal plane of the fuselage 1.

Moreover, the general arrangement of the present invention allows the port lateral fin 6 and the starboard lateral fin 7 to move independent of each other so that the present invention can be better maneuvered as a whole. Thus, the port lateral fin 6 is tiltably mounted to the fuselage 1, and the starboard lateral fin 7 is tiltably mounted to the fuselage 1. The port lateral fin 6 and the starboard lateral fin 7 are positioned opposite to each other about the fuselage 1 and are positioned in between the bow 2 and a stern 3 of the fuselage 1 so that port lateral fin 6 and the starboard lateral fin 7 are positioned on the fuselage 1 to efficiently and effectively maneuver the fuselage 1 about its yaw axis, its pitch axis 4, and/or its roll axis 5.

The present invention needs to lock the front boom 8 and the front propulsion unit 18 in place while the present invention is maintaining one of its three modes. In one embodiment illustrated in FIG. 2, the present invention may further comprise a front proximal locking mechanism 65 and a front distal locking mechanism 66, which are mechanically designed to function independent from each other. However, the front proximal locking mechanism 65 and the front distal locking mechanism 66 work in unison with each other to adjust the position and the orientation of the front boom 8 and the front propulsion unit 18. The front proximal locking mechanism 65 is operatively integrated into the front proximal hinge joint 9 so that the front proximal locking mechanism 65 is able to selectively slow or stop the rotation of the front boom 8 about the front proximal hinge joint 9. The front proximal locking mechanism 65 can be, but is not limited to, a disc-and-caliper braking system, wherein the disc would be mounted to the front boom 8 and the caliper would be mounted to the fuselage 1. The front distal locking mechanism 66 is also operatively integrated into the front distal hinge joint 11 so that the front distal locking mechanism 66 is able to selectively slow or stop the rotation of the front propulsion unit 18 about the front distal hinge joint 11. The front distal locking mechanism 66 can also be, but is not limited to, a disc-and-caliper braking system, wherein the disc would be mounted to the front propulsion unit 18 and the caliper would be mounted to the front boom 8. Alternatively, the front proximal locking mechanism 65 and the front distal locking mechanism 66 can both be a solenoid controlled mechanism that used one or more solenoid-activated pins or servomotor.

Figure 3:
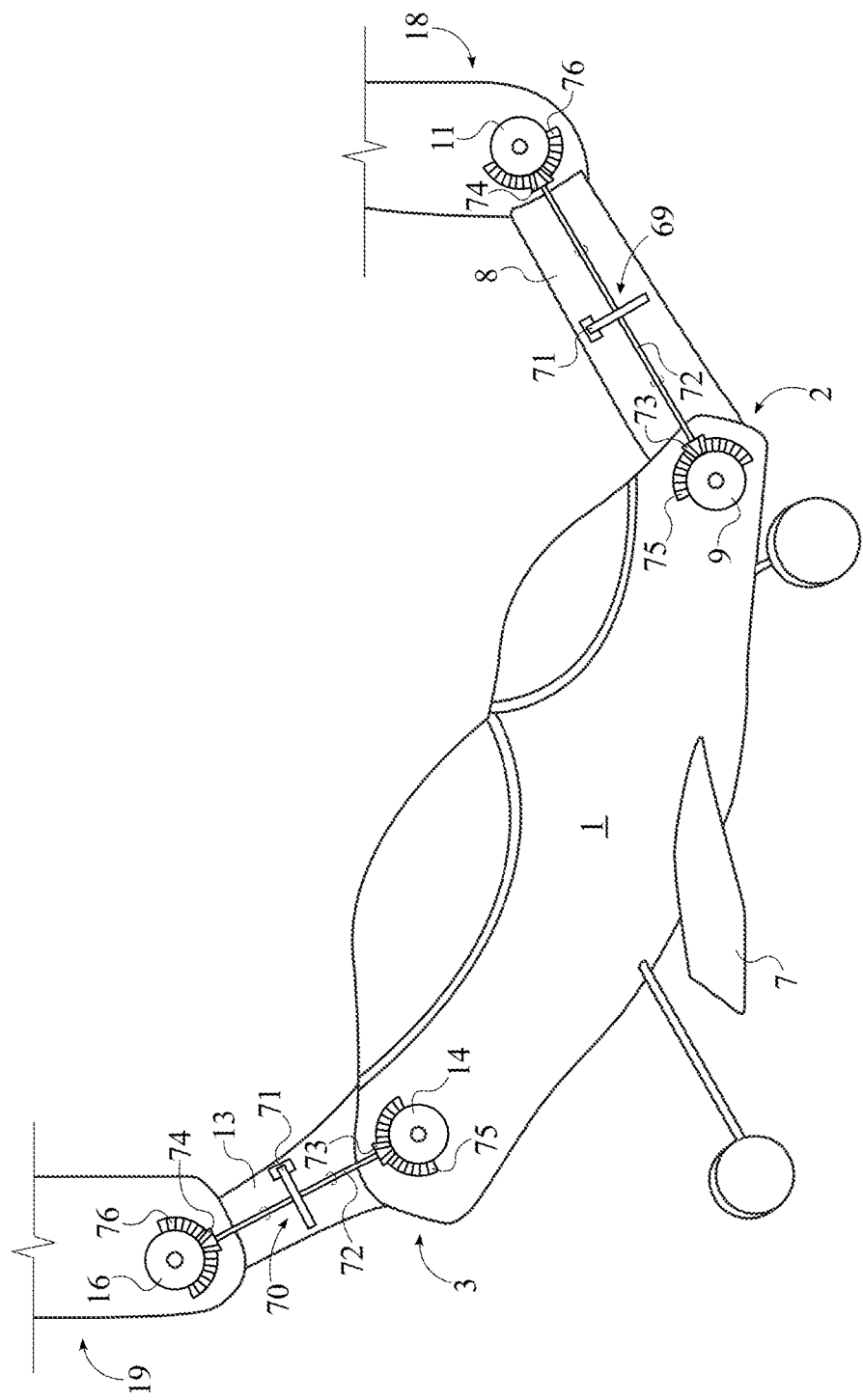
FIG. 3 is a magnified side view of the present invention that illustrates how shared braking mechanisms are integrated through the present invention.

In another embodiment illustrated in FIG. 3, the present invention may further comprise a front shared locking mechanism 69, which allows the present invention to slow or stop the rotation of the front boom 8 and the rotation of the front propulsion unit 18 in unison. The front shared locking mechanism 69 comprises a disc braking system 71, an input axle 72, a proximal pinion 73, a distal pinion 74, a proximal crown gear 75, and a distal crown gear 76. The disc braking system 71 provides the actual means of slowing or stopping the rotation of the front boom 8 and the rotation of the front propulsion unit 18. The disc braking system 71 is mounted within the front boom 8 so that the disc braking system 71 is able to distribute its braking force to the front proximal hinge joint 9 and the front distal hinge joint 11. The input axle 72 is torsionally integrated through the disc braking system 71. Moreover, the proximal pinion 73 and the distal pinion 74 are torsionally connected to the input axle 72 and are positioned opposite to each other along the input axle 72. This arrangement between the input axle 72, the proximal pinion 73, and the distal pinion 74 allows the disc braking system 71 to distribute its braking force to the proximal pinion 73 and the distal pinion 74 through the input axle 72.

Moreover, the proximal crown gear 75 and the distal crown gear 76 are respectively used to receive the braking force from the disc braking system 71 with the front proximal hinge joint 9 and to the front distal hinge joint 11. The proximal crown gear 75 is axially aligned with the front proximal hinge joint 9 and is fixed to the fuselage 1, which slows or stops the rotation of the front boom 8 as the braking force is transferred through the enmeshment between the proximal pinion 73 and the proximal crown gear 75. In addition, the distal crown gear 76 is axially aligned with the front distal hinge joint 11 and is fixed to the fuselage 1, which slows or stops the rotation of the front propulsion unit 18 as the braking force is transferred through the enmeshment between the distal pinion 74 and the distal crown gear 76.

Figure 2:
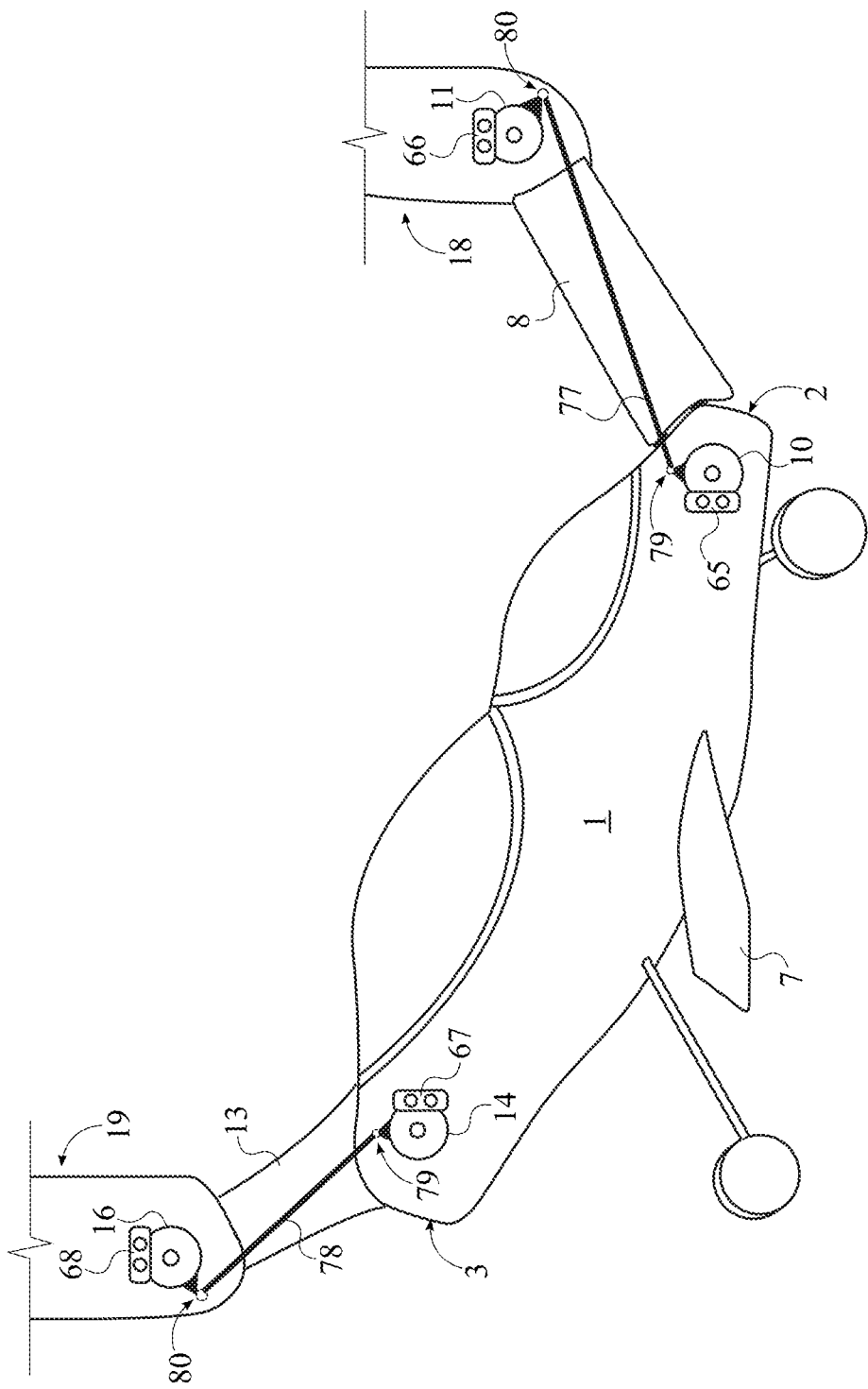
FIG. 2 is a magnified side view of the present invention that illustrates how individual braking mechanisms are integrated through the present invention.

The front boom 8 and the front propulsion unit 18 need to be moved in unison as the present invention is in flight. Thus, the present invention may further comprise a front stabilizer rod 77 in order to further guide the movement between the front boom 8 and the front propulsion unit 18 in a more controlled manner. As can be seen in FIG. 2, the front stabilizer rod 77 has a proximal rod end 79 and a distal rod end 80, which are opposing ends of the front stabilizer rod 77. The proximal rod end 79 is hingedly connected to the fuselage 1, adjacent to the front proximal hinge joint 9, and the distal rod end 80 is hingedly connected to the fuselage 1, adjacent to the front distal hinge joint 11. Overall, the movement between the fuselage 1 and the front propulsion unit 18 is dictated by the front boom 8 between the front proximal hinge joint 9 and the front distal hinge joint 11, but this arrangement for the proximal rod end 79 and the distal rod end 80 helps to stabilize the movement between the fuselage 1 and the front propulsion unit 18.

Figure 4:
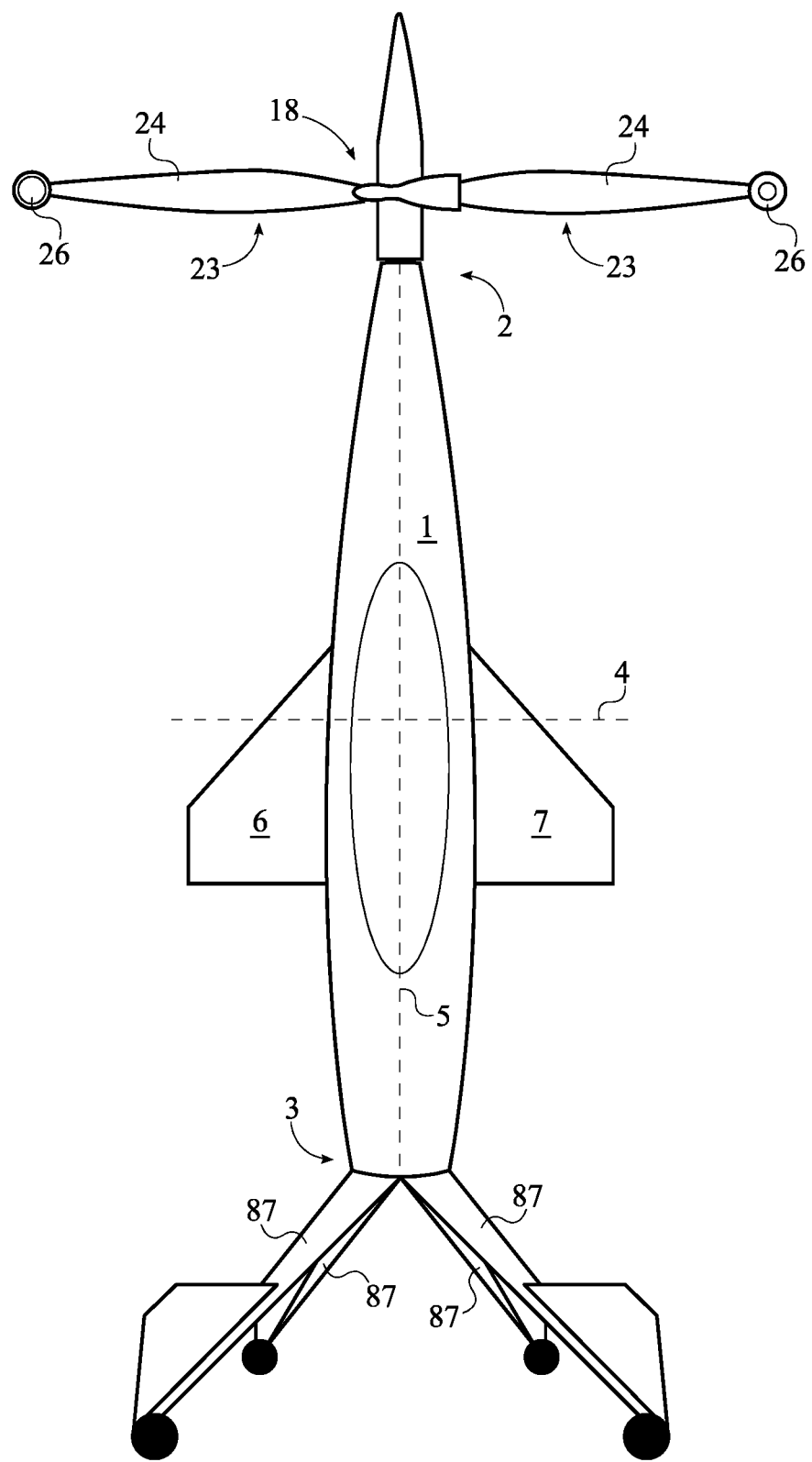
FIG. 4 is a side view of the present invention that illustrates a plurality of landing legs in an expanded configuration, wherein the first embodiment of the stern is configured with the plurality of landing legs.
Figure 5:
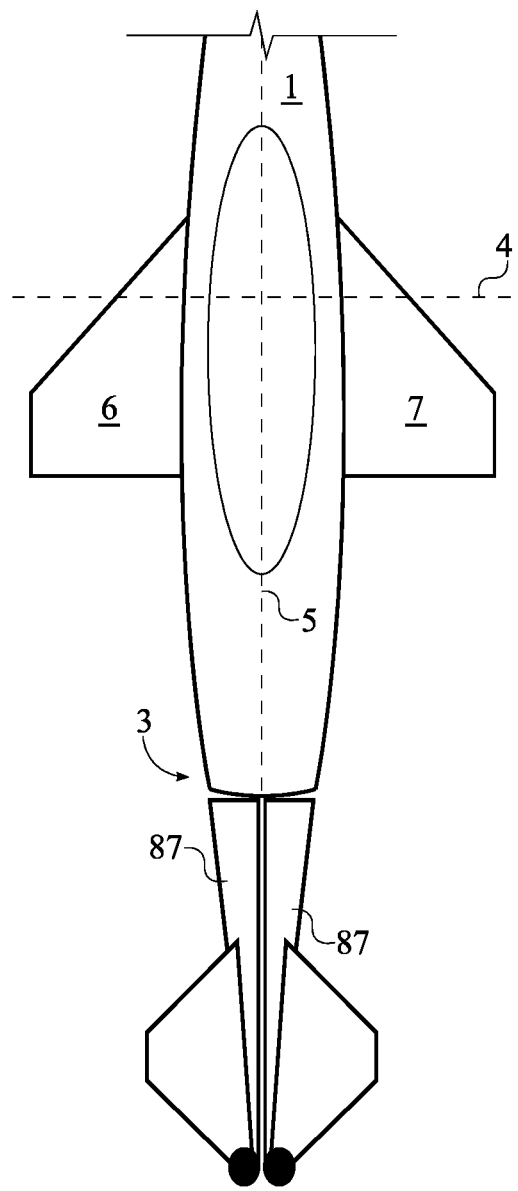
FIG. 5 is a side view of the present invention that illustrates a plurality of landing legs in a collapsed configuration, wherein the present invention is configured with the first embodiment of the stern.
Figure 6:
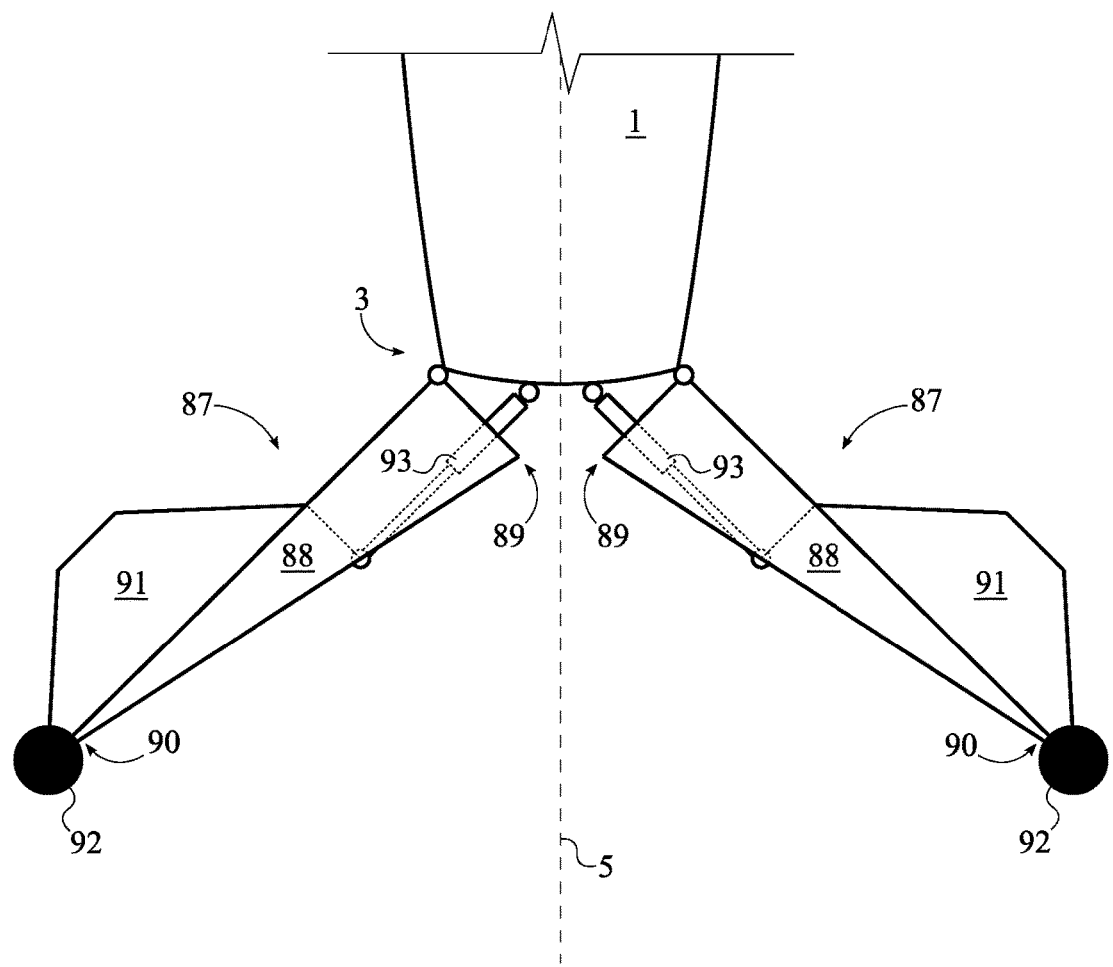
FIG. 6 is a magnified side view of the present invention that illustrates a plurality of landing legs in an expanded configuration, wherein the present invention is configured with the first embodiment of the stern.

The stern 3 of the fuselage 1 can be configured in two different embodiments. In the first embodiment of the stern 3 illustrated in FIGS. 4, 5, and 6, the present invention is only powered by the front propulsion unit 18 and, consequently, may further comprise a plurality of landing legs 87. In the first embodiment, the fuselage 1 takes off from an upright position so that the roll axis 5 of the fuselage 1 is normal to the ground. Also in the first embodiment, the present invention does not require a front boom 8, which alternatively allows the front propulsion unit 18 to be directly fixed to the bow 2 of the fuselage 1. The plurality of landing legs 87 is radially distributed about the roll axis 5 of the fuselage 1 in order to evenly hold the stern 3 off of the ground. Moreover, each of the plurality of landing legs 87 comprises a leg body 88, a fin 91, a shock pad 92, and an actuator 93, which are shown in FIG. 6. The leg body 88 provides the structure for each of the plurality of landing legs 87 and has a proximal leg end 89 and a distal leg end 90, which are opposing ends of the leg body 88. The proximal leg end 89 is hingedly connected to the stern 3 so that the leg body 88 can extend away from the roll axis 5 of the fuselage 1, if the plurality of landing legs 87 is in an expanded configuration that allows the present invention to land onto and to rest upon the ground. The hinged connection between the proximal leg end 89 and the stern 3 also allows the leg body 88 to retract towards the roll axis 5 of the fuselage 1, if the plurality of landing legs 87 is in a collapsed configuration that allows the present invention in flight to maintain an overall aerodynamic profile. The actuator 93 is operatively coupled in between the leg body 88 and the stern 3 so that the actuator 93 is able to move the leg body 88 between the expanded configuration (FIG. 4) and the collapsed configuration (FIG. 5). The shock pad 92 is connected onto the distal leg end 90 so that the shock pad 92 is able to cushion the leg body 88 against the ground. The fin 91 is connected adjacent to the leg body 88 in between the proximal leg end 89 and the distal leg end 90 and is radially oriented away from the roll axis 5 so that the fin 91 for each of the plurality of landing legs 87 is able to aerodynamically guide the present invention in flight while the plurality of landing legs 87 is in the collapsed configuration.

Figure 8:
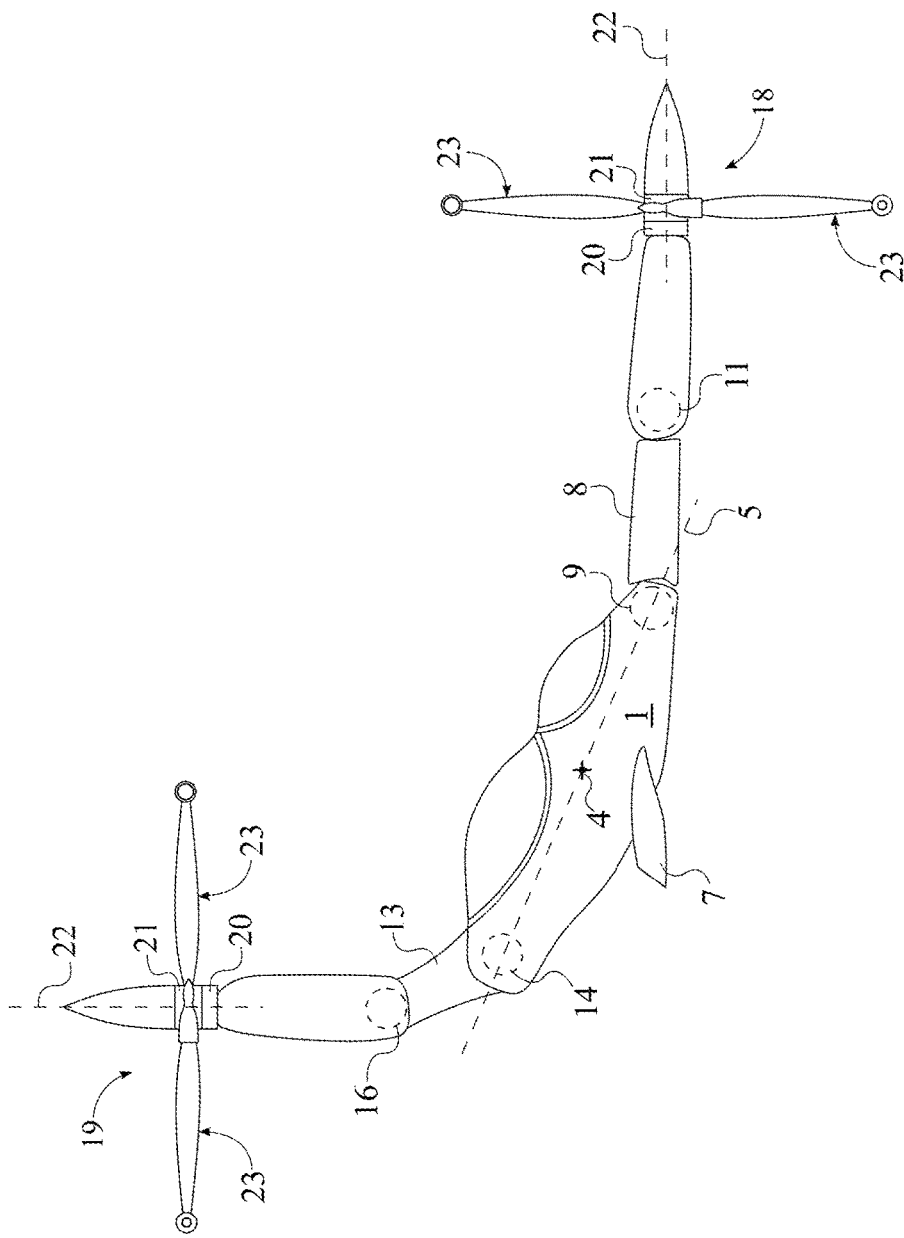
FIG. 8 is a side view of the present invention being configured into the shuttle mode, wherein the present invention is configured with the second embodiment of the stern.
Figure 9:
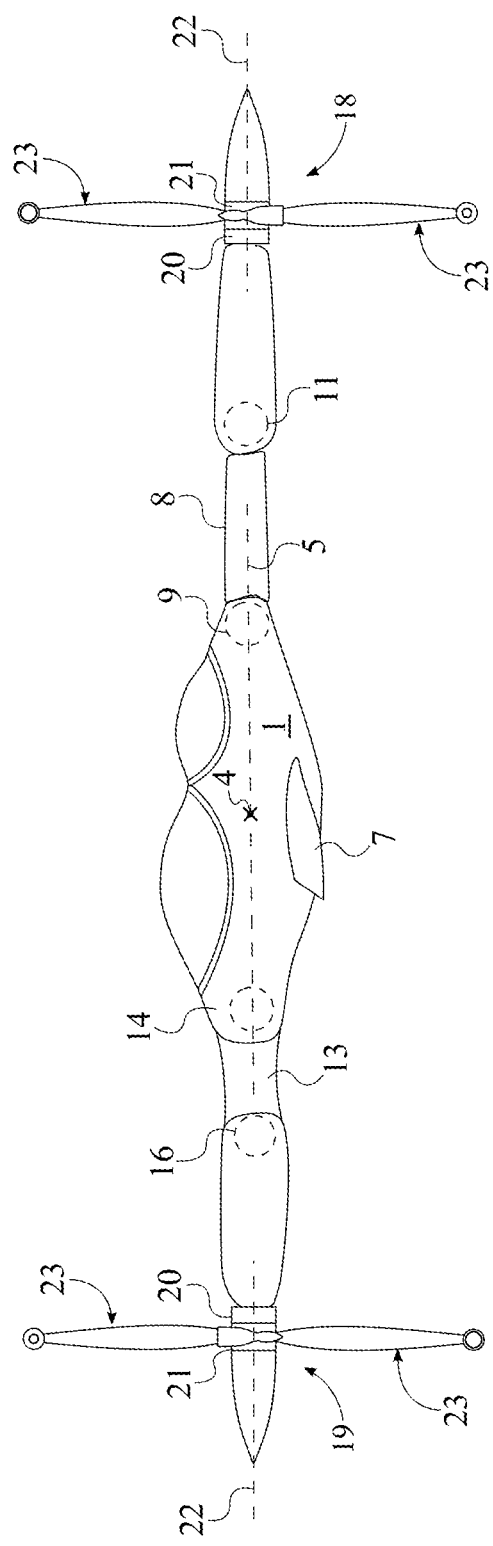
FIG. 9 is a side view of the present invention being configured into the high speed mode, wherein the present invention is configured with the second embodiment of the stern.

In the second embodiment of the stern 3 illustrated in FIGS. 1, 8, and 9, the present invention is configured with another propulsion unit. Thus, the present invention further comprises a rear boom 13, a rear propulsion unit 19, a rear proximal hinge joint 14, and a rear distal hinge joint 16, which are used in a similar manner to the front boom 8, the front propulsion unit 18, the front proximal hinge joint 9, and the front distal hinge joint 11. The general arrangement of the rear boom 13 and the rear propulsion unit 19 allows the present invention to structurally reconfigure itself in midflight. The rear boom 13 is mounted adjacent to the stern 3 by the rear proximal hinge joint 14, which provides the rear boom 13 with one rotational degree of freedom with the fuselage 1. The rear propulsion unit 19 is mounted adjacent to the rear boom 13 by the rear distal hinge joint 16, which also provides the rear propulsion unit 19 with one rotation degree of freedom with the rear boom 13. The rear proximal hinge joint 14 and the rear distal hinge joint 16 are positioned opposite to each other along the rear boom 13 and are used to reorient the rear boom 13 and the rear propulsion unit 19 to their necessary positions during any of the three modes of the present invention. As a result, the rotation axis 15 of the rear proximal hinge joint 14 and the rotation axis 17 of the rear distal hinge joint 16 are positioned parallel to the pitch axis 4 of the fuselage 1 so that the rear propulsion unit 19 can only be coincidently oriented in the Sagittal plane of the fuselage 1. Moreover, the second embodiment of the stern 3 allows the present invention to utilize two independent propulsion units that are capable of being oriented in two separate directions in the Sagittal plane of the fuselage 1. The front propulsion unit 18 and the rear propulsion unit 19 are also designed to readily alternate between either providing a pulling-type propulsion or providing a pushing-type propulsion.

Figure 7:
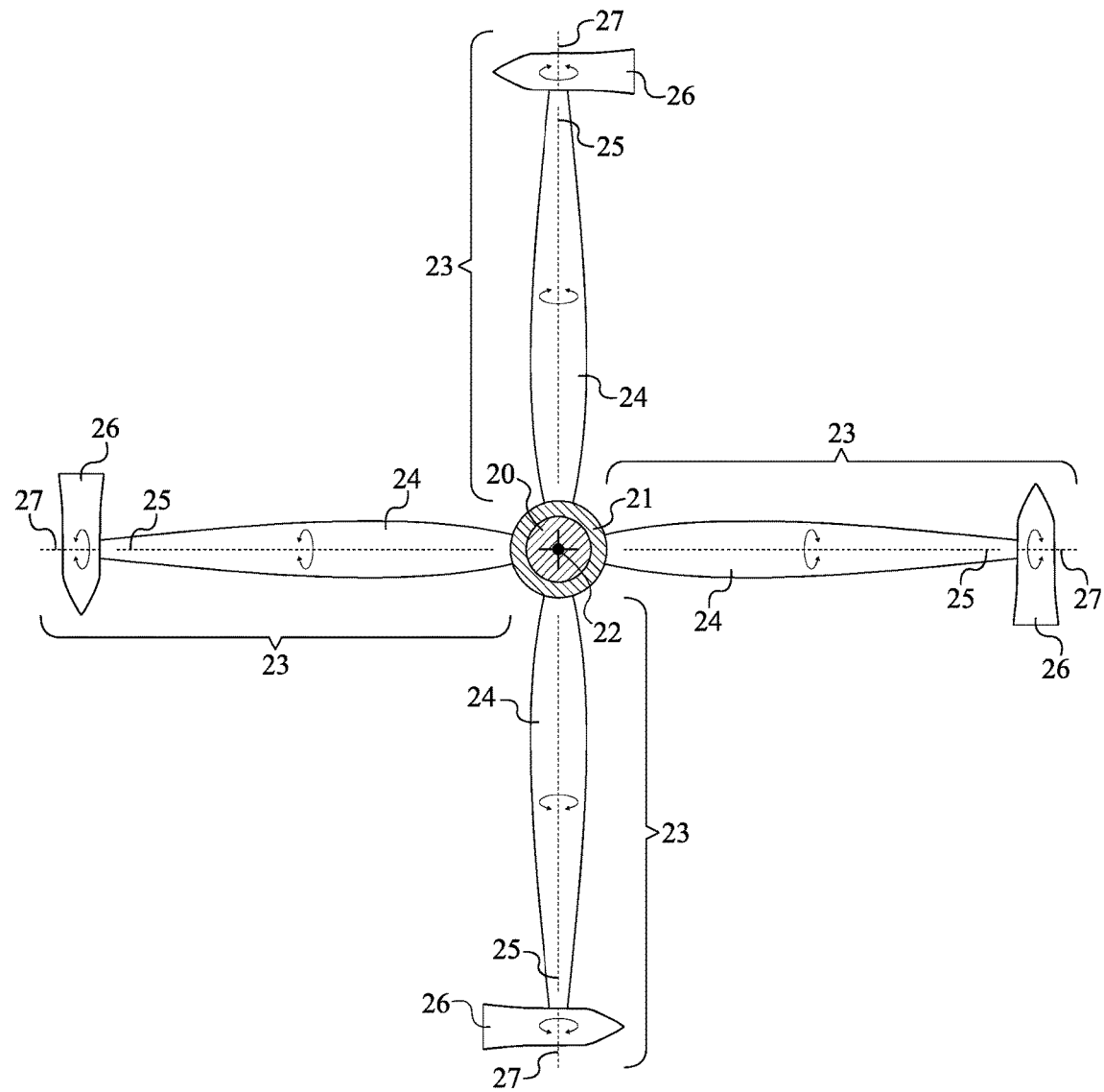
FIG. 7 is a magnified top cross-sectional view of either the front propulsion unit or the rear propulsion unit for the present invention.

In both embodiments of the stern 3, the front propulsion unit 18 and the rear propulsion unit 19 have a preferred engine configuration that combine different kinds of aerodynamic components in order to generate the necessary thrust for its respective propulsion unit. Moreover, the front propulsion unit 18 and the rear propulsion unit 19 each comprise a stator 20, a rotor 21, and a plurality of propelling units 23, which are shown in FIG. 7. The stator 20 of the front propulsion unit 18 is fixed to the front distal hinge joint 11, while the stator 20 of the rear propulsion unit 19 is fixed to the rear distal hinge joint 16, which allows the stator 20 to be the stationary portion of its respective propulsion unit. The rotor 21 is rotatably mounted to the stator 20 so that the rotor 21 is able revolve the plurality of propelling units 23 about a central rotation axis 22 of the rotor 21. The rotor 21 is also preferably driven by an electric motor. The plurality of propelling units 23 also needs to radially position around the central rotation axis 22 of the rotor 21, which allows the plurality of propelling units 23 to evenly apply thrust around its respective propulsion unit. In addition, each of the plurality of propelling units 23 comprises a propeller body 24 and a rocket 26. The propeller body 24 is an airfoil that is rotatably and adjacently mounted to the rotor 21, which allows the propeller body 24 to rotate about its pitch axis 25. The plurality of propelling units 23 can either orient every propeller body 24 about its pitch axis 25 in order to induce the pulling-type propulsion or orient every propeller body 24 about its pitch axis 25 in order to induce the pushing-type propulsion. The rocket 26 is used to increase the angular speed of the propeller body 24 about the central rotation axis 22 of the rotor 21 and is used to assist in the thrust direction of its respective propulsion unit. The rocket 26 is adjacently mounted to the propeller body 24, opposite to the rotor 21, which allows the rocket 26 to apply the maximum amount of torque on the rotor 21 through the propeller body 24. In addition, the rocket 26 is rotatably mounted to the propeller body 24 so that the rocket 26 can also rotate about its pitch axis 27.

The combination of the front propulsion unit 18 and the rear propulsion unit 19 allows the present invention to be configured into three modes: the VTOL mode, the shuttle mode, and the high speed mode. The thrust direction of the front propulsion unit 18 and the thrust direction of the rear propulsion unit 19 are independently oriented to attract or oppose each other, which allows the present invention to configure into those three modes. Once the movement of the front propulsion unit 18 and the rear propulsion unit 19 approaches one of those three modes, the present invention uses a set of mechanisms in order to slow the movement of the front propulsion unit 18 and the rear propulsion unit 19 and to lock the front propulsion unit 18 and the rear propulsion unit 19 into either the VTOL mode, the shuttle mode, or the high speed mode. More specifically, if the front propulsion unit 18, the fuselage 1, and the rear propulsion unit 19 are aligned in the VTOL mode, then the present invention can take off the ground from a standstill position or can make a vertical landing onto the ground. In order to configure the present invention into the VTOL mode illustrated in FIG. 1, the central rotation axis 22 for a rotor 21 of the front propulsion unit 18 and the central rotation axis 22 for a rotor 21 of the rear propulsion unit 19 are oriented parallel to each other and are oriented in an upward direction. Also for the VTOL mode, the front propulsion unit 18 and the rear propulsion unit 19 are configured to provide the pulling-type propulsion, and, consequently, are rotating in opposite directions. In the most optimal orientation of the VTOL mode, the central rotation axis 22 for the rotor 21 of the front propulsion unit 18 is approximately oriented at a 70-degree angle with the roll axis 5 of the fuselage 1 and the central rotation axis 22 for the rotor 21 of the rear propulsion unit 19 approximately oriented at a 110-degree angle with the roll axis 5 of the fuselage 1, which allows the occupants of the present invention to have maximum visibility.

Alternatively, if the front propulsion unit 18, the fuselage 1, and the rear propulsion unit 19 are aligned in the shuttle mode, then the present invention is preparing to transition to the high speed mode, staying suspended in-flight, and stabilizing its decent from very high altitudes. In order to configure the present invention into the shuttle mode illustrated in FIG. 8, the central rotation axis 22 for the rotor 21 of the front propulsion unit 18 is oriented at an angle with the roll axis 5 of the fuselage 1. This angle is preferably greater than or equal to 90 degrees because an angle of less than 90 degrees would allow the rear propulsion unit 19 to create drag on the present invention. However, this angle can intentionally be made to be less than 90 degrees when the shuttle mode is being used to stabilize the present invention's decent from sub-orbital altitudes, while using a regenerative braking feature of an electric motor incorporated into the stator 20 and the rotor 21 to charge the portable power source of the present invention. Also for the shuttle mode, the front propulsion unit 18 and the rear propulsion unit 19 are configured to provide the pulling-type propulsion, and, consequently, are rotating in opposite directions. In the most optimal orientation of the shuttle mode, the central rotation axis 22 for the rotor 21 of the front propulsion unit 18 is approximately oriented at a 160-degree angle with the roll axis 5 of the fuselage 1 and the central rotation axis 22 for the rotor 21 of the rear propulsion unit 19 approximately oriented at a 110-degree angle with the roll axis 5 of the fuselage 1, which similarly allows the occupants of the present invention to have maximum visibility.

Alternatively, if the front propulsion unit 18, the fuselage 1, and the rear propulsion unit 19 are aligned in the high speed mode illustrated in FIG. 9, then the present invention is able to travel at its fastest possible speed. In order to configure the present invention in the high speed mode, the central rotation axis 22 for a rotor 21 of the front propulsion unit 18 and the central rotation axis 22 for a rotor 21 of the rear propulsion unit 19 are oriented collinear with the roll axis 5 of the fuselage 1. Also for the high speed mode, the front propulsion unit 18 is configured to provide the pulling-type propulsion, and the rear propulsion unit 19 is configured to provide the pushing-type propulsion. Consequently, the front propulsion unit 18 and the rear propulsion unit 19 are rotating in the same direction. Moreover, as the present invention is climbing to a sub-orbital altitude, the thrust generated by the propeller body 24 for each of the plurality of propelling units 23 becomes less effective as the air gets progressively thinner. The present invention compensates for this loss in thrust from the propeller body 24 by reorienting the rocket 26 about its pitch axis 27 in order to gradually aim the thrust from the rockets 26 of the front propulsion unit 18 towards the bow 2 and in order to gradually aim the thrust from the rockets 26 of the rear propulsion unit 19 away from the stern 3. The rocket 26 begins to burn higher concentration of accelerant fuel as the rockets 26 of the front propulsion unit 18 and the rockets 26 of the rear propulsion 19 provides the primary thrust for the plurality of propelling units 23. The thrust generated by the rocket 26 is also oriented about its pitch axis 27 in order to maintain the necessary angular speed of the rotor 21, which allows gyroscopic forces induced on the fuselage 1 to stabilize the present invention. These gyroscopic forces allow the present invention to fly free of the Earth's atmosphere and continues to accelerate in a controlled and efficient manner.

The present invention can use, but is not limited to, two different configurations for the front propulsion unit 18 and the rear propulsion unit 19 in order to adjust the pitch axis 25 of the propeller body 24. In the first configuration illustrated in FIGS. 10 and 11, the front propulsion unit 18 and the rear propulsion unit 19 each need to further comprise a swash-plate assembly 35 and a propeller control mechanism 42, which are used to rotate the propeller body 24 about its pitch axis 25. The pitch axis 25 of the propeller body 24 is oriented perpendicular to the central rotation axis 22 of the rotor 21. The propeller control mechanism 42 is operatively coupled to the propeller body 24 for each of the plurality of propelling units 23 through the swash-plate assembly 35. The propeller control mechanism 42 is used to adjust the collective pitch of the plurality of propelling units 23 so that the propeller body 24 for each of the plurality of propelling units 23 is able to adjust their pitch in unison. In addition, the propeller control mechanism 42 is also used to adjust the cyclic pitch of the propeller body 24 for each of the plurality of propelling units 23 so that the propeller body 24 is able to independently adjust its own pitch.

The swash-plate assembly 35 is able to receive collective pitch adjustments or cyclic pitch adjustments from the propeller control mechanism 42 and send either of those pitch adjustments to the propeller body 24 for each of the plurality of propelling units 23. The swash-plate assembly 35 comprises a plate base 36, a ball-and-socket joint 37, an inner swash-disc 38, an outer swash-ring 39, a plurality of input sockets 40, and a plurality of output sockets 41. The plate base 36 allows the other components of the swash-plate assembly 35 to be securely mounted within the stator 20. More specifically, the plate base 36 is slidably mounted within the stator 20, and both the plate base 36 and the ball-and-socket joint 37 is positioned along the central rotation axis 22 of the rotor 21, which allows the entire swash-plate assembly 35 to move along the central rotation axis 22 of the rotor 21. The plate base 36 is pivotably and centrally mounted to the inner swash-disc 38 by the ball-and-socket joint 37, which provides the inner swash-disc 38 with two rotational degrees of freedom. The outer swash-ring 39 is rotatably mounted around the inner swash-disc 38 so that the outer swash-ring 39 is able to rotate with the rotor 21 while the inner swash-disc 38 remains fixed to the stator 20. The plurality of input sockets 40 is used to receive the actuation commands from the propeller control mechanism 42 and is peripherally integrated into the inner swash-disc 38. The plurality of output sockets 41 is used to mechanically transmit those actuation commands to the propeller body 24 for any of the plurality of propelling units 23 and, thus, is peripherally integrated into the outer swash-ring 39. The radial separation between the plurality of input sockets 40 and the plurality of output sockets 41 about the central rotation axis 22 of the rotor 21 reduces the mechanical clutter between the propeller control mechanism 42, the swash-plate assembly 35, and the plurality of propelling units 23.

Figure 10:
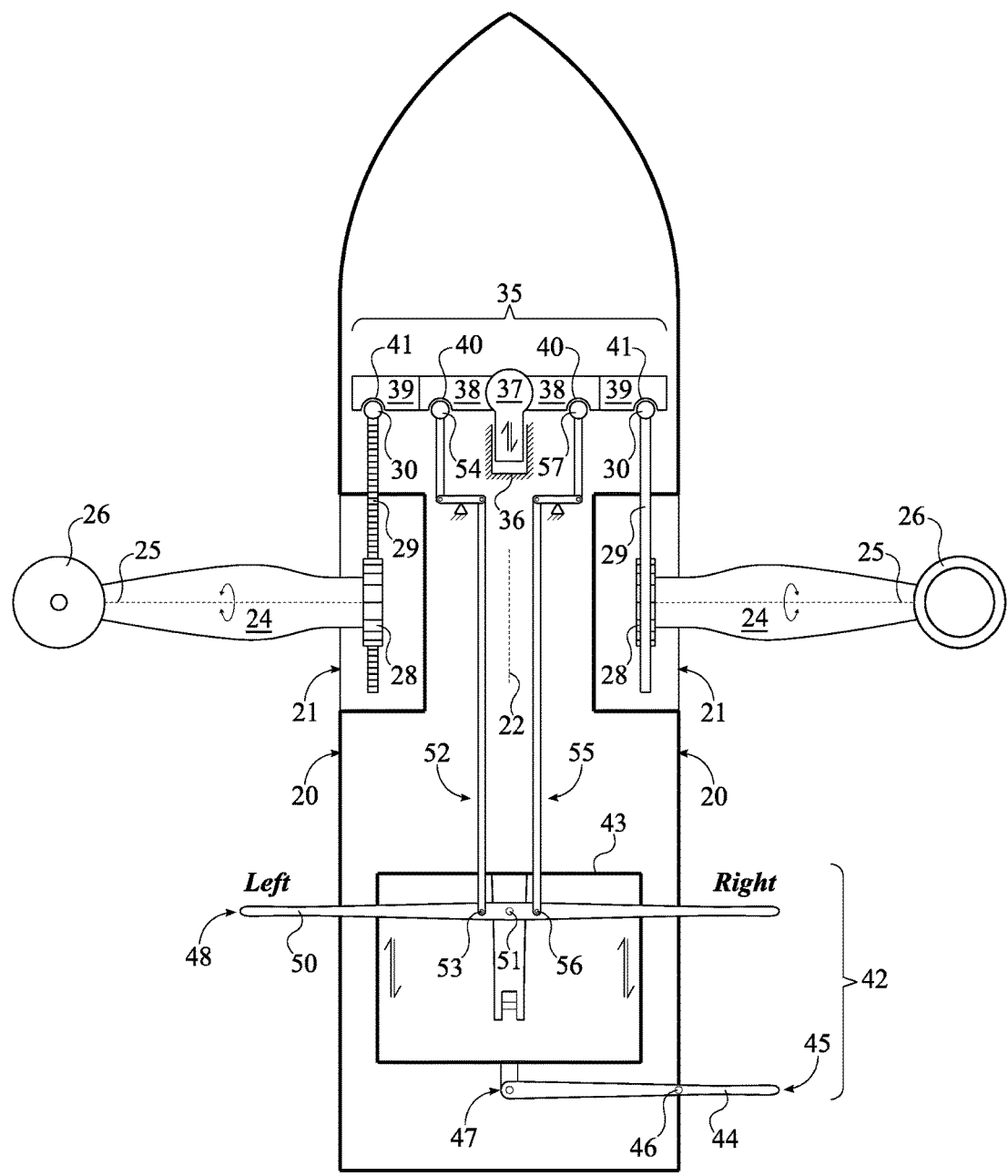
FIG. 10 is a schematic coronal cross-sectional view for the first configuration of either the front propulsion unit or the rear propulsion unit, wherein the first configuration is configured with a swash-plate assembly and the left/right directional controls for a propeller control mechanism.
Figure 11:
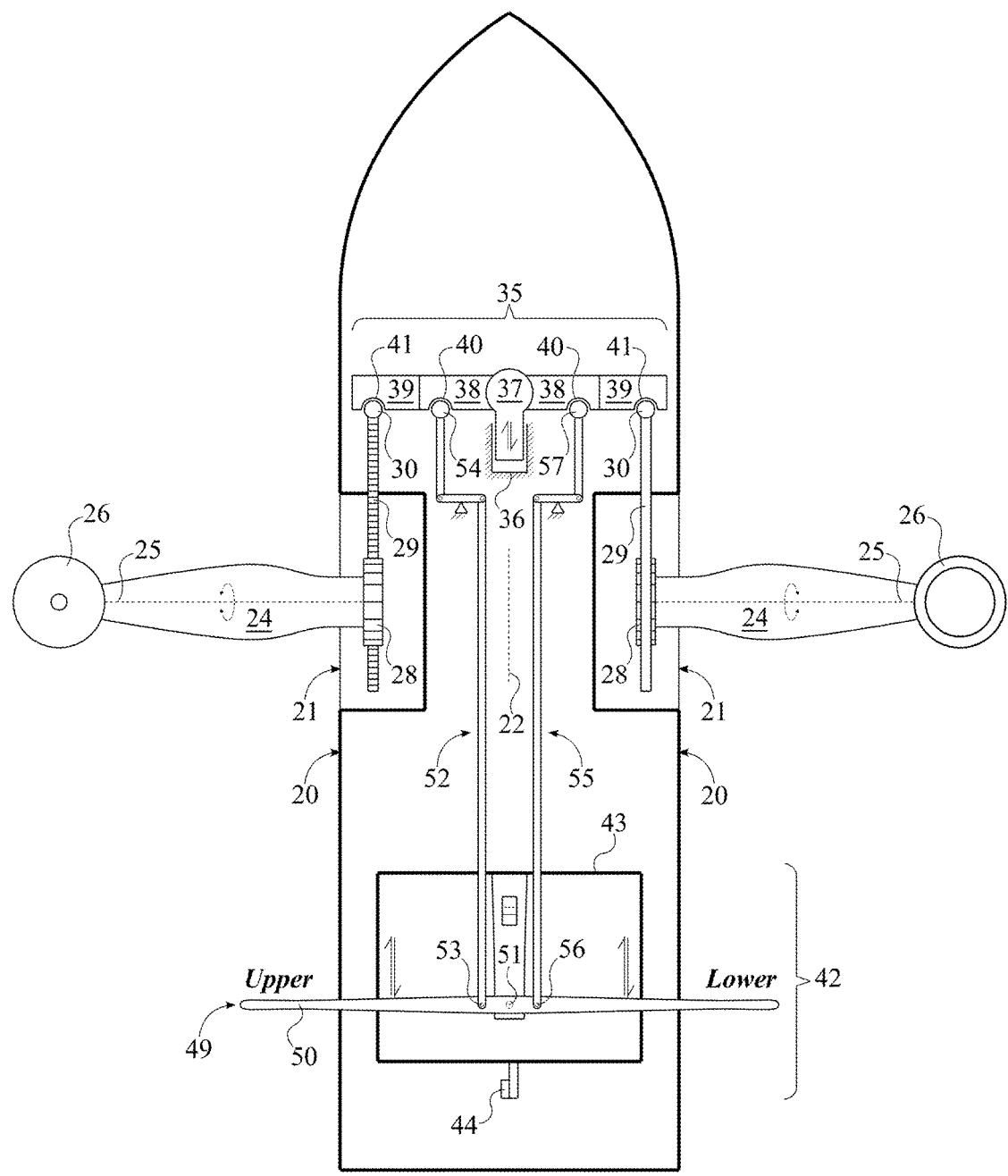
FIG. 11 is a schematic sagittal cross-sectional view for the first configuration of either the front propulsion unit or the rear propulsion unit, wherein the first configuration is configured with the swash-plate assembly and the upper/lower directional controls for the propeller control mechanism.

The actuation commands received by the plurality of input sockets 40 is generated by the propeller control mechanism 42, which comprises a control frame 43, a collective pitch adjustment (PA) lever 44, a left-to-right cyclic PA mechanism 48 shown in FIG. 10, and an upper-to-lower cyclic PA mechanism shown in FIG. 11. The control frame 43 allows the other components of the propeller control mechanism 42 to be securely mounted within the stator 20. More specifically, the control frame 43 is slidably mounted within the stator 20 so that the control frame 43 is able to move in unison with the swash-plate assembly 35. The collective PA lever 44 is used to linearly actuate the control frame 43, which sends actuation commands to the swash-plate assembly 35 to adjust the collective pitch of the propeller body 24 for any of the plurality of propelling units 23. More specifically, a fulcrum 46 of the collective PA lever 44 is hingedly connected to the stator 20, which allows an actuation end 45 of the collective PA lever 44 to be positioned external to the stator 20 and allows a linkage end 47 of the collective PA lever 44 to be coupled adjacent to the control frame 43. Thus, if the actuation end 45 of the collective PA lever 44 is pushed or pulled by the present invention, then the linkage end 47 of the collective PA lever 44 will pull or push the control frame 43.

The left-to-right cyclic PA mechanism 48 and the upper-to-lower cyclic PA mechanism 49 are used to adjust the cyclic pitch of the propeller body 24 for each of the plurality of propelling units 23 but are also able to provide the mechanical connection between the collective PA lever 44 and the swash-plate assembly 35. The left-to-right cyclic PA mechanism 48 and the upper-to-lower cyclic PA mechanism 49 each comprise a control lever 50, a first mechanical linkage 52, and a second mechanical linkage 55. The control lever 50 is used to linearly actuate its respective cyclic PA mechanism. The control lever 50 of left-to-right cyclic PA mechanism 48 and the control lever 50 of the upper-to-lower cyclic PA mechanism 49 is positioned perpendicular to each other, which allows the left-to-right cyclic PA mechanism 48 and the upper-to-lower cyclic PA mechanism 49 to linearly actuate any radial portion of the swash-plate assembly 35. A fulcrum 51 of the control lever 50 is hingedly mounted within the control frame 43 so that the control lever 50 is able to linearly actuate in one of two opposing directions depending on which side of the fulcrum 51 that the control lever 50 is being pulled or pushed by the present invention. The first mechanical linkage 52 and the second mechanical linkage 55 are used to respectively transfer the linear actuation of the control lever 50 from one of the two opposing directions to the swash-plate assembly 35. Thus, an actuation end 53 of first mechanical linkage 52 is hingedly connected to the control lever 50, and an actuation end 56 of second mechanical linkage 55 is hingedly connected to the control lever 50. The fulcrum 51 of the control lever 50 is positioned in between the actuation end 53 of the first mechanical linkage 52 and the actuation end 56 of the second mechanical linkage 55, which allows the control lever 50 to linearly actuate the first mechanical linkage 52 and the second mechanical linkage 55 in opposite directions. In addition, a ball-shaped end 54 of the first mechanical linkage 52 and a ball-shaped end 57 of the second mechanical linkage 55 are pivotably engaged to a corresponding pair of opposing input sockets from the swash-plate assembly 35, which completes the transfer of the actuation commands from the propeller control mechanism 42 to the swash-plate assembly 35.

As can be seen in FIGS. 10 and 11, the aforementioned configuration between the swash-plate assembly 35 and the propeller control mechanism 42 allows the present invention to send actuation commands for either adjusting the collective pitch or adjusting the cyclic pitch. For adjusting the collective pitch, when the collective PA lever 44 is actuated by the present invention, the control frame 43 either simultaneously pulls or simultaneously pushes the first mechanical linkage 52 and the second mechanical linkage 55 for both the left-to-right cyclic PA mechanism 48 and the upper-to-lower cyclic PA mechanism 49 in order to actuate the swash-plate assembly 35 about the entire perimeter of the inner swash-disc 38. For adjusting the cyclic pitch, when the control lever 50 of the left-to-right cyclic PA mechanism 48 or the control lever 50 of the upper-to-lower cyclic PA mechanism 49 is actuated by the present invention, the first mechanical linkage 52 and the second mechanical linkage 55 of the corresponding cyclic PA mechanism are used to actuate the swash-plate assembly 35 at diametrically-opposing perimeter sections of the inner swash-disc 38.

In order to relay the actuation commands from the swash-plate assembly 35 to the propeller body 24 for any of the plurality of propelling units 23, each of the plurality of propelling units 23 needs to further comprise a propeller pinion gear 28, a propeller rack gear 34, and a ball insert 30. The propeller pinion gear 28 is connected around the propeller body 24, adjacent to the rotor 21, and is axially aligned around the pitch axis 25 of the propeller body 24. The propeller pinion gear 28 is used to rotate the propeller body 24 about its pitch axis 25, while the propeller rack gear 34 is tangentially engaged to the propeller pinion gear 28 so that the propeller rack gear 34 is able to drive the rotation of the propeller pinion gear 28. The ball insert 30 is used as a pivotable attachment point that allows the swash-plate assembly 35 to actuate the propeller rack gear 34. Thus, the ball insert 30 is pivotably engaged to a corresponding output socket from the swash-plate assembly 35. In addition, the ball insert 30 is connected adjacent to the propeller rack gear 34, offset from the propeller pinion gear 28, which allows the propeller pinion gear 28 to roll along the propeller rack gear 34 without mechanical interference from the ball insert 30.

Figure 13:
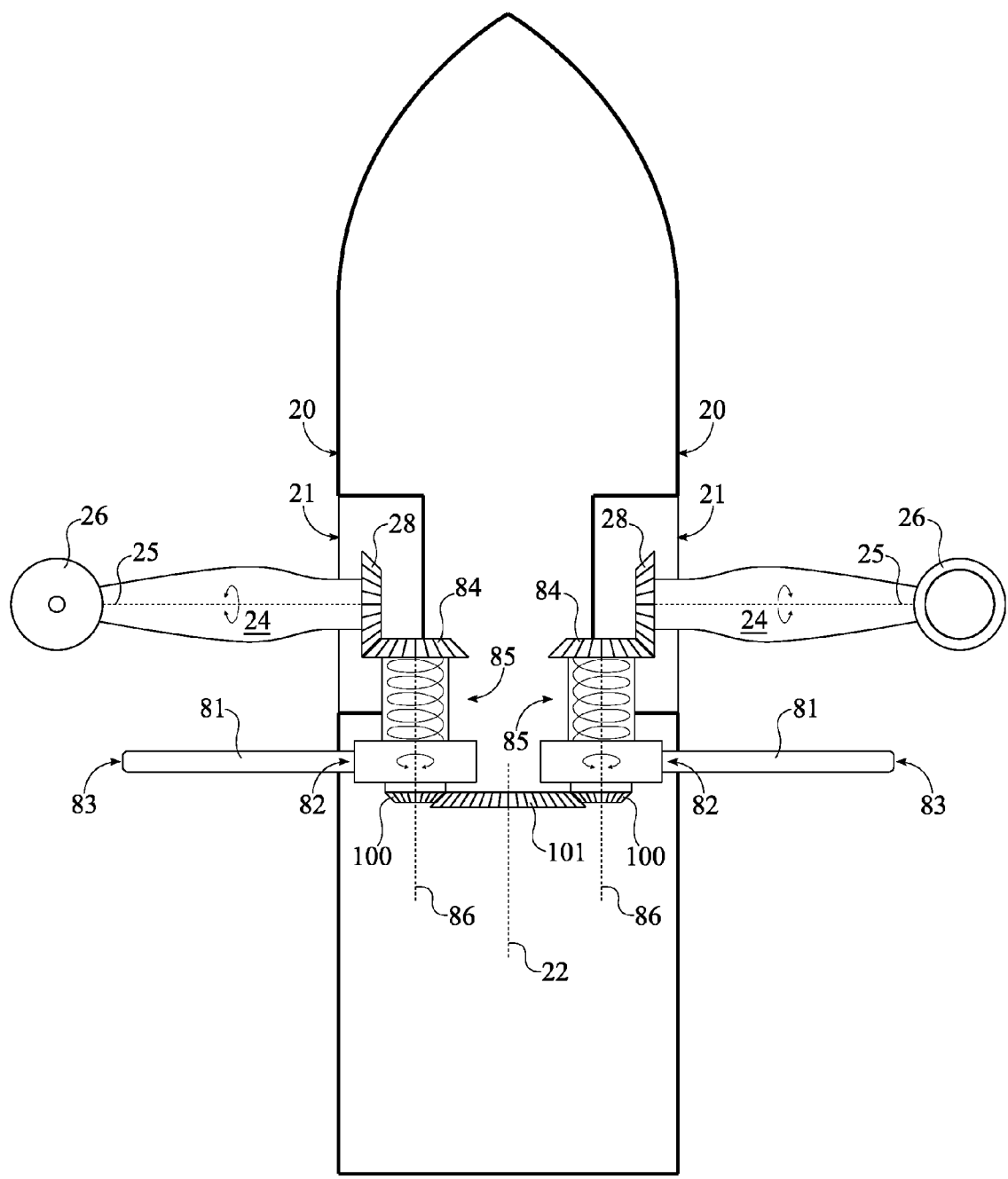
FIG. 13 is a schematic side cross-sectional view for the second configuration of either the front propulsion unit or the rear propulsion unit, wherein the second configuration is configured with a plurality of flyweights.
Figure 14:
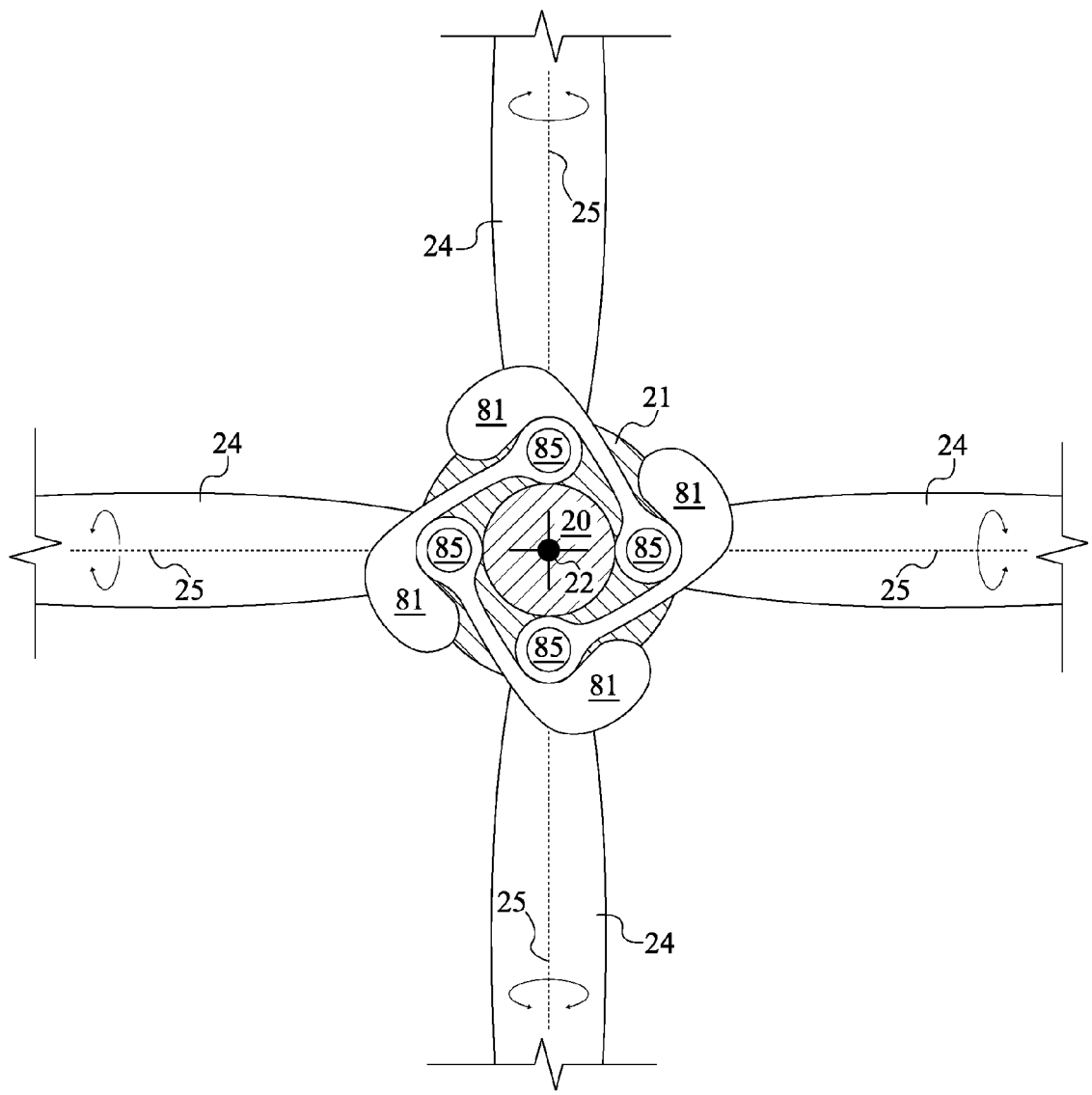
FIG. 14 is a schematic top cross-sectional view for the second configuration of either the front propulsion unit or the rear propulsion unit, wherein the plurality of flyweights is radially collapsed around the rotor.
Figure 15:
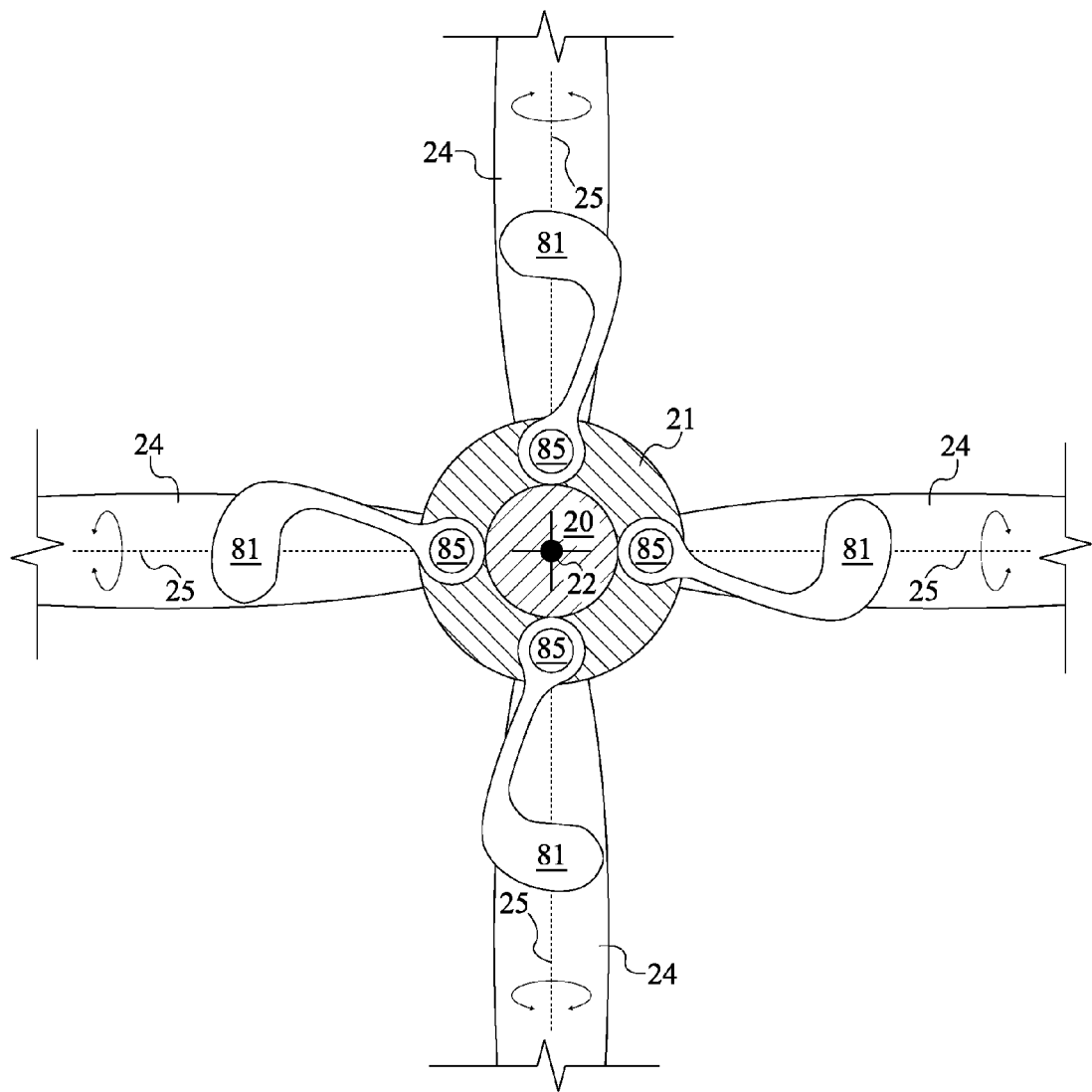
FIG. 15 is a schematic top cross-sectional view for the second configuration of either the front propulsion unit or the rear propulsion unit, wherein the plurality of flyweights is radially extended from the rotor.

In the second configuration to adjust the pitch axis 25 of the propeller body 24, the front propulsion unit 18 and the rear propulsion unit 19 are only able to adjust the collective pitch for the plurality of propelling units 23. In the second configuration for the front propulsion unit 18 and the rear propulsion unit 19, each of the plurality of propelling units 23 further comprises a propeller pinion gear 28, a flyweight arm 81, a flyweight pinion gear 84, and a torsionally elastic hinge joint 85, which are illustrated in FIG. 13. The flyweight arm 81 has a fixed arm end 82 and a free arm end 83, which are opposing ends of the flyweight arm 81. The fixed arm end 82 is mounted adjacent to the rotor 21 by the torsionally elastic hinge joint 85. A torsion spring is preferably integrated into the torsionally elastic hinge joint 85. In addition, the rotation axis 86 of the torsionally elastic hinge joint 85 is oriented parallel to the central rotation axis 22 of the rotor 21, which allows the free arm end 82 to move towards and away from the rotor 21 based on the centripetal force felt by the flyweight arm 81. Consequently, the torsionally elastic hinge joint 85 moves the free arm end 82 towards the rotor 21 as the angular speed of the rotor 21 decelerates and comes to zero, which can be seen in FIG. 14, and the torsionally elastic hinge joint 85 moves the free arm end 82 away from the rotor 21 as the angular speed of the rotor 21 increases, which can be seen in FIG. 15. Moreover, the flyweight pinion gear 84 is torsionally connected to the torsionally elastic hinge joint 85 so that the flyweight pinion gear 84 is able to transfer the rotational motion from the flyweight arm 81 to the propeller body 24. Similar to the first configuration of the front propulsion unit 18 and the rear propulsion unit 19, the propeller pinion gear 28 is connected around the propeller body 24, adjacent to the rotor 21, and is axially aligned around the pitch axis 25 of the propeller body 24, which allows the propeller pinion gear 28 to rotate the propeller body 24 about its pitch axis 25. The propeller pinion gear 28 is enmeshed to the flyweight pinion gear 84 so that the rotational motion from the flyweight arm 81 can be received by the propeller body 24 and can be used to adjust the propeller body 24 about its pitch axis 25.

Also in the second configuration to adjust the pitch axis 25 of the propeller body 24, the present invention further comprises a plurality of planet gears 100 and an annular sun gear 101. The annular sun gear 101 is rotatably mounted about the central rotation axis 22 of the rotor 21, which allows the annular sun gear 101 to unobtrusively interact with the plurality of propelling units 23. Each of the plurality of planet gears 100 is integrated into the fixed arm end 82 of a corresponding unit from the plurality of propelling units 23 and shares the rotation axis 86 with the torsionally elastic hinge joint 85 of the corresponding unit. In addition, each of the plurality of planet gears 100 is engaged with the annular sun gear 101, which forces each of the plurality of planet gears 100 to rotate in unison and consequently restricts the independent movement of the propeller body 24 for each of the plurality of propelling units 23. This configuration between the plurality of planet gears 100 and the annular sun gear 101 allows the present invention to minimize vibrations and ensures safe operation for the second configuration to adjust the pitch axis 25 of the propeller body 24.

Figure 12:
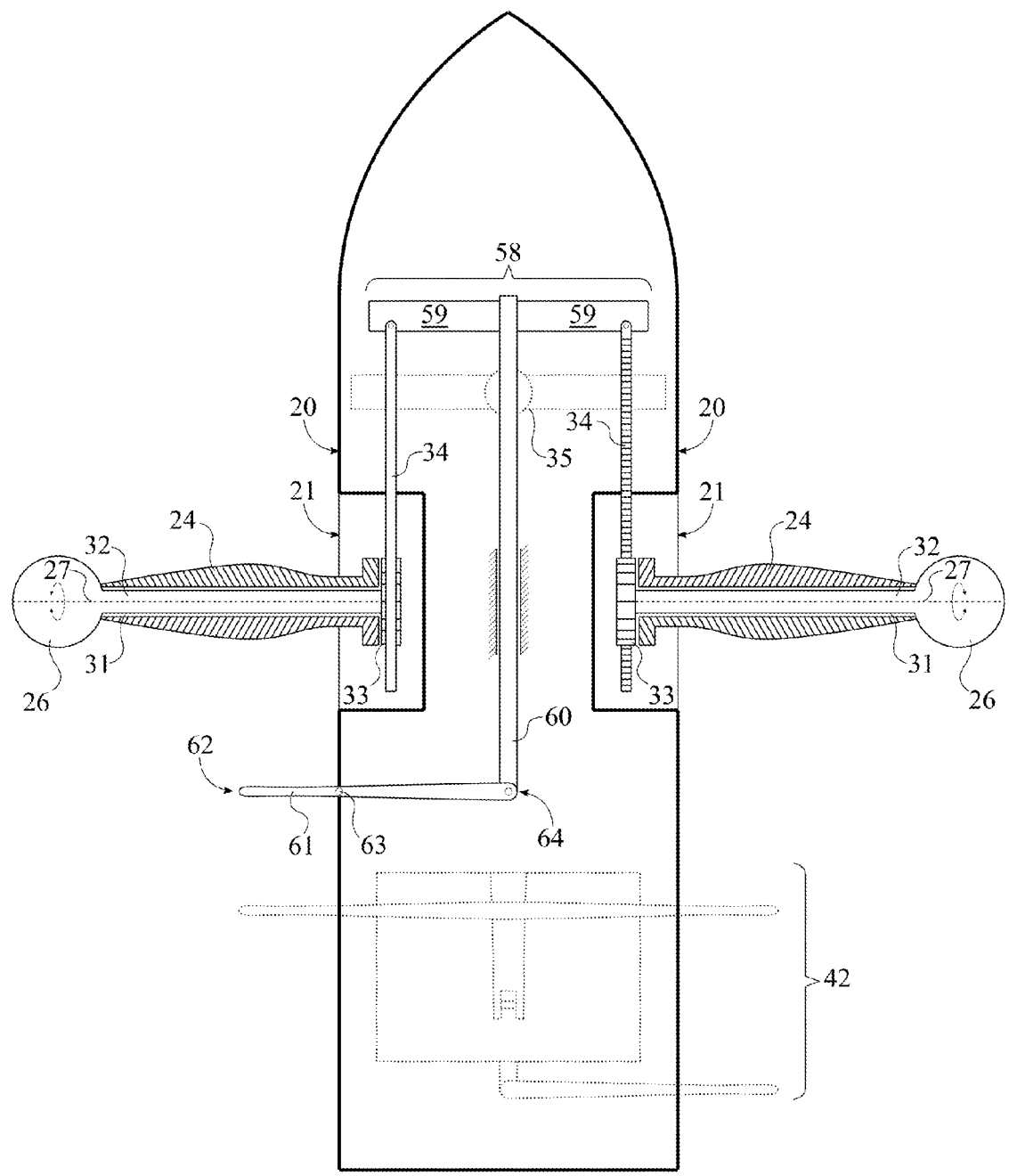
FIG. 12 is a schematic side cross-sectional view for the first configuration of either the front propulsion unit or the rear propulsion unit, wherein the first configuration is configured with a piston assembly and a rocket pitch adjustment lever.

In order to adjust the pitch of the rocket 26, the front propulsion unit 18 and the rear propulsion unit 19 each need to further comprise a piston assembly 58 and a rocket PA lever 61, which are used to rotate the rocket 26 about its pitch axis 27. As can be seen in FIG. 12, the pitch axis 27 of the rocket 26 is oriented perpendicular to the central rotation axis 22 of the rotor 21. The rocket PA lever 61 is used to actuate the piston assembly 58, which in turn adjusts the pitch for the rocket 26 on each of the plurality of propelling units 23. Consequently, the rocket PA lever 61 is operatively coupled to the rocket 26 for each of the plurality of propelling units 23 through the piston assembly 58 so that the rocket PA lever 61 can be used to adjust the pitch for the rocket 26 on each of the plurality of propelling units 23 in unison.

The piston assembly 58 is able to receive pitch adjustments from the rocket PA lever 61 and send those pitch adjustments to the rocket 26 for each of the plurality of propelling units 23. The piston assembly 58 comprises a head 59 and a control shaft 60. The control shaft 60 allows the piston assembly 58 to receive actuation commands from the rocket PA lever 61 and thus is slidably mounted with the stator 20. More specifically, a fulcrum 63 of the rocket PA lever 61 is hingedly connected to the stator 20, which allows an actuation end 62 of the rocket PA lever 61 to be positioned external to the stator 20 and allows a linkage end 64 of the rocket PA lever 61 to be coupled adjacent to the control shaft 60. Thus, if the actuation end 62 of the rocket PA lever 61 is pushed or pulled by the present invention, then the linkage end 64 of the rocket PA lever 61 will pull or push the control shaft 60. Moreover, the control shaft 60 also needs to be positioned along the central rotation axis 22 of the rotor 21 in order for the head 59 to be rotatably connected around the control shaft 60. This allows the head 59 to follow the same rotational movement as the rotor 21 and the plurality of propelling units 23. In addition, the head 59 is fixed to control shaft 60 so that the head 59 follows the same linear movement as the control shaft 60. The head 59 is used to distribute and relay the linear movement received through the control shaft 60 as the pitch adjustments to the rocket 26 for each of the plurality of propelling units 23. The head 59 and the linkage end 64 of the rocket PA lever 61 are also positioned opposite to each other along the control shaft 60 so that the control shaft 60 is able to provide some offset distance between the head 59 and the rocket PA lever 61 and is able to prevent mechanical interference between the head 59 and the rocket PA lever 61.

In order to relay the actuation commands from the head 59 to the rocket 26 for each of the plurality of propelling units 23, each of the plurality of propelling units 23 needs to further comprise a sleeving channel 31, a rocket shaft 32, a rocket pinion gear 33, and a rocket rack gear 34, which are shown in FIG. 12. The rocket shaft 32 is used to support and maneuver the rocket 26. The sleeving channel 31 is an elongated hole that traverses through the propeller body 24 so that rocket shaft 32 can be positioned through the sleeving channel 31 and can be rotatably mounted within the propeller body 24. Moreover, the rocket 26 needs to be connected adjacent to the rocket shaft 32, exterior to the propeller body 24. This configuration between the rocket 26, the rocket shaft 32, and the propeller body 24 allows the rocket 26 to adjust its pitch without disturbing the functionality of the propeller body 24. The rocket pinion gear 33 is connected adjacent to the rocket shaft 32, opposite to the rocket 26 and exterior to the propeller body 24. The rocket pinion gear 33 is axially aligned around the pitch axis 27 of the rocket 26. The rocket pinion gear 33 is used to rotate the rocket 26 about its pitch axis 27, while the rocket rack gear 34 is tangentially engaged to the rocket pinion gear 33 so that the rocket rack gear 34 is able the drive the rotation of the rocket pinion gear 33. In addition, the rocket rack gear 34 is peripherally coupled to the head 59 of the piston assembly 58 in order to actuate the rocket rack gear 34 with the piston assembly 58. The coupling between the rocket rack gear 34 and the head 59 of the piston assembly 58 is offset from the rocket pinion gear 33, which allows the rocket pinion gear 33 to roll along the rocket rack gear 34 without mechanical interference from the head 59 of the piston assembly 58. Moreover, in order to prevent mechanical interference between the linear actuation of the propeller rack gear 29 and the linear actuation of the rocket rack gear 34, the engagement point between the propeller pinion gear 28 and the propeller rack gear 29 and the engagement point between the rocket pinion gear 33 and the rocket rack gear 34 are positioned opposite to each other about the pitch axis 25 of the propeller body 24 for each of the plurality of propeller units 23.

Figure 16:
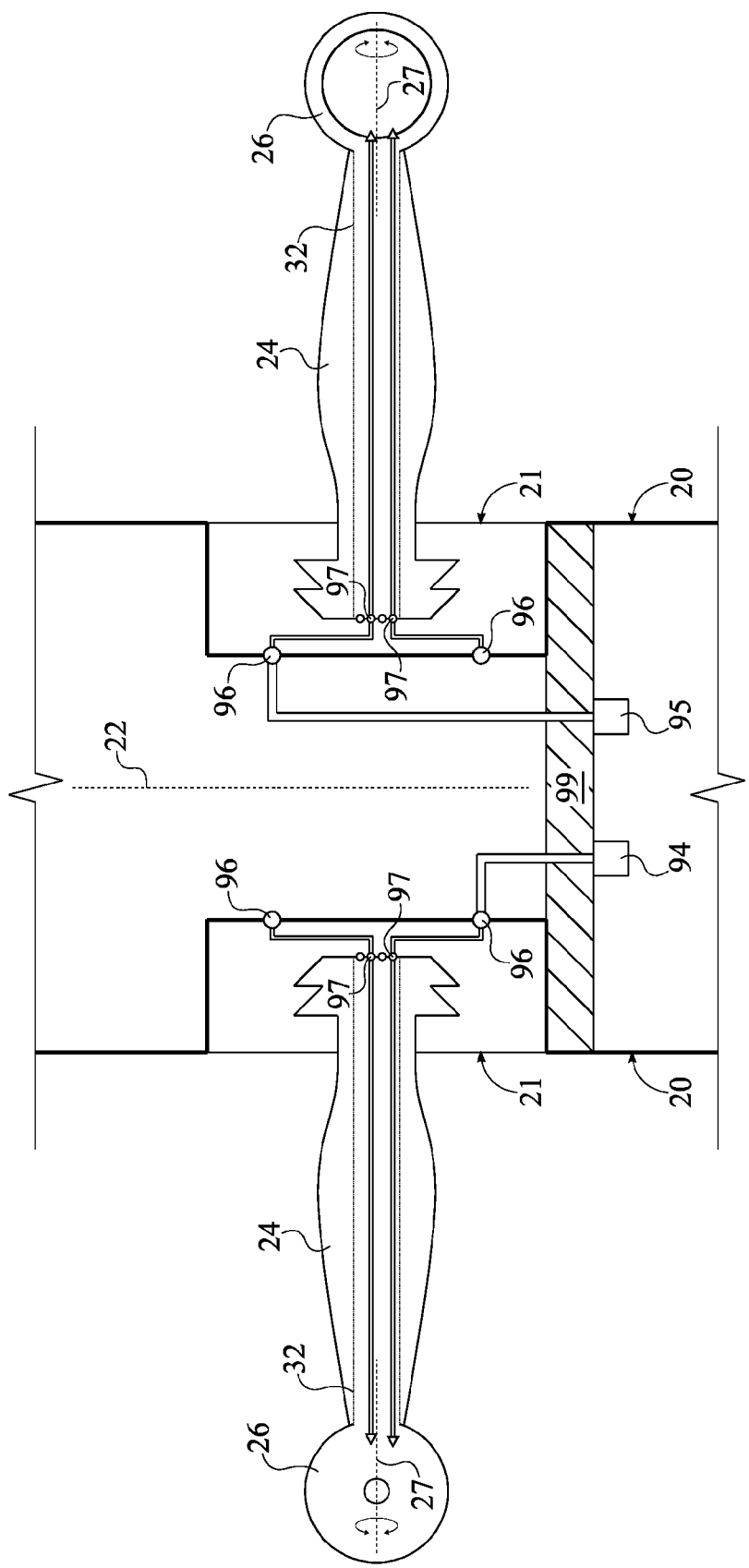
FIG. 16 is a schematic side cross-sectional view of either the front propulsion unit or the rear propulsion unit that illustrate the rocket fuel lines travelling from the fuel inputs, through the firewall, through the stator, through the rotor, through each propeller, and to each rocket

As can be seen in FIG. 16, the front propulsion unit 18 and the rear propulsion unit 19 are designed to safely deliver fuel to the rocket 26 for each of the plurality of propelling units 23, which are typically orbiting about the stator 20 at a very high angular speed. Thus, the front propulsion unit 18 and the rear propulsion unit 19 each need to further comprise a catalyst input 94, an accelerant input 95, and a first set of annular grooves 96. The catalyst input 94 provides the catalyst portion of the rocket fuel that is needed to power the rocket 26, such as a quantity of hydrogen peroxide. The accelerant input 95 provides the accelerant portion of the rocket fuel that is needed to power the rocket 26, such as a quantity of hydrogen. The first set of annular grooves 96 is in fluid communication with both the catalyst input 94 and the accelerant input 95, which allows the first set of annular grooves 96 to receive the necessary components of the rocket fuel from the catalyst input 94 and the accelerant input 95. The first set of annular grooves 96 is an interface that allows the safe exchange of rocket fuel between the stator 20, which is fixed in place, and the rotor 21, which is rotating about the stator 20. Consequently, the first set of annular grooves 96 needs to be integrated in between the rotor 21 and the stator 20 and needs to be positioned around the central rotation axis 22 of the rotor 21. This configuration for the first set of annular grooves 96 prevents mechanical hindrance between the rotor 21 and the stator 20.

Once the rocket fuel enters into the rotor 21 through the first set of annular grooves 96, the rocket fuel is evenly distributed to each of the plurality of propelling units 23. Thus, each of the plurality of propelling units 23 for both the front propulsion unit 18 and the rear propulsion unit 19 needs to further comprise a second set of annular grooves 97. The second set of annular grooves 97 is in fluid communication with the first set of annular grooves 96 so that the rocket fuel is able to travel through the rotor 21. Similar to the first set of annular grooves 96, the second set of annular grooves 97 is an interface that allows the safe exchange of rocket fuel between the rotor 21 and the rocket shaft 32 as the rocket 26 rotates about its pitch axis 27. Therefore, the second set of annular grooves 97 needs to be integrated in between the rocket shaft 32 and the rotor 21 and needs to be positioned around the pitch axis 27 of the rocket 26. This configuration for the second set of annular grooves 97 prevents mechanical hindrance between the rocket shaft 32 and the rotor 21. Finally, the rocket 26 is in fluid communication with the second set of annular grooves 97 so that both the accelerant portion and the catalyst portion of the rocket fuel are able to separately reach the rocket 26 through the rocket shaft 32. The accelerant portion and the catalyst portion are then mixed and ignited within the rocket 26 in order to generate the required thrust with the rocket 26.

In order to further ensure the safety of the present invention, the front propulsion unit 18 and the rear propulsion unit 19 each comprise a firewall 99, which is used to prevent a large scale explosion in case any malfunctions occurs with the plurality of propelling units 23 for either the front propulsion unit 18 or the rear propulsion unit 19. The firewall 99 is mounted within the stator 20, adjacent to the rotor 21, and the catalyst input 94 and the accelerant input 95 is mounted adjacent to the firewall 99, opposite the rotor 21, so that the present invention provides a physical barrier between the accessible rocket fuel and the mechanical moving parts of the rotor 21. Furthermore, the firewall 99 is used an integral mounting surface between the stator 20 and the other components of its respective propulsion unit (more specifically, the respective distal hinge joint) and provides a stronger composite structure for its respective propulsion unit. More specifically, the firewall 99 is sandwiched between the portion of the stator 20 that mounts the rotor 21 and the portion of the stator 20 that houses the propeller control mechanism 42.

The front propulsion unit 18 and the rear propulsion unit 19 can each be used to house or mount a number of supplementary features for the present invention. One such supplementary feature is the spinner, which is mounted onto the rotor 21, opposite to its respective boom. The spinner is made of lightweight, strong composite material and is used to aerodynamically shape its respective propulsion unit as the central rotation axis 22 of the rotor 21 centrally traverses through the spinner. Another supplementary feature is the electronics array, which includes, but is not limited to, radio, radar, and an autonomous control system that communicates with an automated traffic control system. The electronics array is housed within the spinner for both the front propulsion unit 18 and the rear propulsion unit 19. Another supplementary feature is the electronics housing, which is used to dampen the vibrations felt by the electronics array and is used to prevent the electronics array from physical damage. Thus, the electronics array is mounted within the electronics housing, which is mounted to the control shaft 60 of the piston assembly 58 and is positioned within the spinner. Another supplementary feature is a long range antenna, which can be mounted within the spinner because the long range antenna is far enough away from the cockpit electronics to avoid possible interference. Another supplementary feature is a plurality of electric motor windings that are incorporated into the stator 20 with the corresponding magnets incorporated into the housing of the rotor 21. Thus, the plurality of electric motor windings and the corresponding magnets enable electric power to be used as either a primary or secondary source of propulsion for both the front propulsion unit 18 and the rear propulsion unit 19.

The present invention has a number of mirrored features that are for both the front section and the rear section of the present invention. One such mirrored feature is that the present invention needs to lock the rear boom 13 and the rear propulsion unit 19 in place while the present invention is maintaining one of its three modes. In one embodiment illustrated in FIG. 2, the present invention may further comprise a rear proximal locking mechanism 67 and a rear distal locking mechanism 68, which are mechanically designed to function independent from each other. However, the rear proximal locking mechanism 67 and the rear distal locking mechanism 68 work in unison with each other to adjust the position and the orientation of the rear boom 13 and the rear propulsion unit 19. The rear proximal locking mechanism 67 is operatively integrated into the rear proximal hinge joint 14 so that the rear proximal locking mechanism 67 is able to selectively slow or stop the rotation of the rear boom 13 about the rear proximal hinge joint 14. Similar to the front proximal locking mechanism 65, the rear proximal locking mechanism 67 can be, but is not limited to, a disc-and-caliper braking system, wherein the disc would be mounted to the rear boom 13 and the caliper would be mounted to the fuselage 1. The rear distal locking mechanism 68 is also operatively integrated into the rear distal hinge joint 16 so that the rear distal locking mechanism 68 is able to selectively slow or stop the rotation of the rear propulsion unit 19 about the rear distal hinge joint 16. Similar to the front distal locking mechanism 66, the rear distal locking mechanism 68 can also be, but is not limited to, a disc-and-caliper braking system, wherein the disc would be mounted to the rear propulsion unit 19 and the caliper would be mounted to the rear boom 13. Alternatively, the rear proximal locking mechanism 67 and the rear distal locking mechanism 68 can both be a solenoid controlled mechanism that used one or more solenoid-activated pins or servomotor.

In another embodiment illustrated in FIG. 3, the present invention may further comprise a rear shared locking mechanism 70, which allows the present invention to slow or stop the rotation of the rear boom 13 and the rotation of the rear propulsion unit 18 in unison. Similar to the front shared locking mechanism 69, the rear shared locking mechanism 70 comprises a disc braking system 71, an input axle 72, a proximal pinion 73, a distal pinion 74, a proximal crown gear 75, and a distal crown gear 76. The disc braking system 71 provides the actual means of slowing or stopping the rotation of the rear boom 13 and the rotation of the rear propulsion unit 19. The disc braking system 71 is mounted within the rear boom 13 so that the disc braking system 71 is able to distribute its braking force to the rear proximal hinge joint 14 and the rear distal hinge joint 16. The input axle 72 is torsionally integrated through the disc braking system 71. Moreover, the proximal pinion 73 and the distal pinion 74 are torsionally connected to the input axle 72 and are positioned opposite to each other along the input axle 72. This arrangement between the input axle 72, the proximal pinion 73, and the distal pinion 74 allows the disc braking system 71 to distribute its braking force to the proximal pinion 73 and the distal pinion 74 through the input axle 72.

Moreover, the proximal crown gear 75 and the distal crown gear 76 are respectively used to receive the braking force from the disc braking system 71 with the rear proximal hinge joint 14 and to the rear distal hinge joint 16. The proximal crown gear 75 is axially aligned with the rear proximal hinge joint 14 and is fixed to the fuselage 1, which slows or stops the rotation of the rear boom 13 as the braking force is transferred through the enmeshment between the proximal pinion 73 and the proximal crown gear 75. In addition, the distal crown gear 76 is axially aligned with the rear distal hinge joint 16 and is fixed to the fuselage 1, which slows or stops the rotation of the rear propulsion unit 19 as the braking force is transferred through the enmeshment between the distal pinion 74 and the distal crown gear 76.

The rear boom 13 and the rear propulsion unit 19 need to be moved in unison as the present invention is in flight. Thus, the present invention may further comprise a rear stabilizer rod 78 in order to further guide the movement between the rear boom 13 and the rear propulsion unit 19 in a more controlled manner. Similar to the front stabilizer rod 77 shown in FIG. 2, the rear stabilizer rod 78 has a proximal rod end 79 and a distal rod end 80, which are opposing ends of the rear stabilizer rod 78. The proximal rod end 79 is hingedly connected to the fuselage 1, adjacent to the rear proximal hinge joint 14, and the distal rod end 80 is hingedly connect to the fuselage 1, adjacent to the rear distal hinge joint 16. Overall, the movement between the fuselage 1 and the rear propulsion unit 19 is dictated by the rear boom 13 between the rear proximal hinge joint 14 and the rear distal hinge joint 16, but this arrangement for the proximal rod end 79 and the distal rod end 80 helps to stabilize the movement between the fuselage 1 and the rear propulsion unit 19.

Although the invention has been explained in relation to its preferred embodiment, it is to be understood that many other possible modifications and variations can be made without departing from the spirit and scope of the invention as hereinafter claimed.

What is claimed is:

1. A gyroscopic orbiter with vertical takeoff and vertical landing capabilities comprises:
   a fuselage;
   a front boom;
   a front proximal hinge joint;
   a front distal hinge joint;
   a front propulsion unit;
   a port lateral fin;
   a starboard lateral fin;
   said fuselage comprises a bow and a stern;
   said front boom being mounted adjacent to said bow by said front proximal hinge joint;
   said front propulsion unit being mounted adjacent to said front boom by said front distal hinge joint;
   said front proximal hinge joint and said front distal hinge joint being positioned opposite to each other along said front boom;
   said port lateral fin being tiltably mounted to said fuselage;
   said starboard lateral fin being tiltably mounted to said fuselage;
   said port lateral fin and said starboard lateral fin being positioned opposite to each other about said fuselage; and
   said port lateral fin and said starboard lateral fin being positioned in between said bow and said stern.

2. The gyroscopic orbiter with vertical takeoff and vertical landing capabilities as claimed in claim 1 comprises:
   a pitch axis of said fuselage;
   a rotation axis of said front proximal hinge joint;
   a rotation axis of said front distal hinge joint; and
   said rotation axis of said front proximal hinge joint and said rotation axis of said front distal hinge joint being positioned parallel to said pitch axis of said fuselage.

3. The gyroscopic orbiter with vertical takeoff and vertical landing capabilities as claimed in claim 1 comprises:
   said front propulsion unit comprises a stator, a rotor, and a plurality of propelling units;
   each of said plurality of propelling units comprises a propeller body and a rocket;
   said stator being fixed to said front distal hinge joint;
   said rotor being rotatably mounted to said stator;
   said plurality of propelling units being radially positioned around a central rotation axis of said rotor;
   said propeller body being rotatably and adjacently mounted to said rotor; and
   said rocket being rotatably and adjacently mounted to said propeller body, opposite to said rotor.

4. The gyroscopic orbiter with vertical takeoff and vertical landing capabilities as claimed in claim 3 comprises:
   said front propulsion unit further comprises a swash-plate assembly and a propeller control mechanism;
   a pitch axis of said propeller body being oriented perpendicular to said central rotation axis of said rotor; and
   said propeller control mechanism being operatively coupled to said propeller body for each of said plurality of propelling units through said swash-plate assembly, wherein said propeller control mechanism is used to adjust collective pitch of said plurality of propelling units and is used to adjust cyclic pitch of said propeller body for each of said plurality of propelling units.

5. The gyroscopic orbiter with vertical takeoff and vertical landing capabilities as claimed in claim 4 comprises:
   said swash-plate assembly comprises a plate base, a ball-and-socket joint, an inner swash-disc, an outer swash-ring, a plurality of input sockets, and a plurality of output sockets;
   said plate base being slidably mounted within said stator;
   said plate base and said ball-and-socket joint being positioned along said central rotation axis of said rotor;
   said plate base being pivotably and centrally mounted to said inner swash-disc by said ball-and-socket joint;
   said outer swash-ring being rotatably mounted around said inner swash-disc;
   said plurality of input sockets being peripherally integrated into said inner swash-disc; and
   said plurality of output sockets being peripherally integrated into said outer swash-ring.

6. The gyroscopic orbiter with vertical takeoff and vertical landing capabilities as claimed in claim 4 comprises:
   said propeller control mechanism comprises a control frame, a collective pitch adjustment (PA) lever, a left-to-right cyclic PA mechanism, and an upper-to-lower cyclic PA mechanism;
   said left-to-right cyclic PA mechanism and said upper-to-lower cyclic PA mechanism each comprise a control lever, a first mechanical linkage, and a second mechanical linkage;
   said control frame being slidably mounted within said stator;
   an actuation end of said collective PA lever being positioned external to said stator;
   a fulcrum of said collective PA lever being hingedly mounted to said stator;
   a linkage end of said collective PA lever being coupled adjacent to said control frame;
   said control lever of said left-to-right cyclic PA mechanism and said control lever of said upper-to-lower cyclic PA mechanism being positioned perpendicular to each other;
   a fulcrum of said control lever being hingedly mounted within said control frame;
   an actuation end of said first mechanical linkage being hingedly connected to said control lever;
   an actuation end of said second mechanical linkage being hingedly connected to said control lever;
   said fulcrum of said control lever being positioned in between said actuation end of said first mechanical linkage and said actuation end of said second mechanical linkage; and
   a ball-shaped end of said first mechanical linkage and a ball-shaped end of said second mechanical linkage being pivotably engaged to a corresponding pair of opposing input sockets from said swash-plate assembly.

7. The gyroscopic orbiter with vertical takeoff and vertical landing capabilities as claimed in claim 4 comprises:
   each of said plurality of propelling units further comprises a propeller pinion gear, a propeller rack gear, and a ball insert;
   a pitch axis of said propeller body being oriented perpendicular to said central rotation axis of said rotor;
   said propeller pinion gear being connected around said propeller body, adjacent to said rotor;
   said propeller pinion gear being axially aligned around said pitch axis of said propeller body;
   said propeller rack gear being tangentially engaged to said propeller pinion gear;
   said ball insert being connected adjacent to said propeller rack gear, offset from said propeller pinion gear; and
   said ball insert being pivotably engaged to a corresponding output socket from said swash-plate assembly.

8. The gyroscopic orbiter with vertical takeoff and vertical landing capabilities as claimed in claim 3 comprises:
   said front propulsion unit further comprises a piston assembly and a rocket PA lever;
   a pitch axis of said rocket being oriented perpendicular to said central rotation axis of said rotor; and
   said rocket PA lever being operatively coupled to said rocket for each of said plurality of propelling units through said piston assembly, wherein said rocket PA lever is used to adjust pitch for said rocket on each of said plurality of propelling units.

9. The gyroscopic orbiter with vertical takeoff and vertical landing capabilities as claimed in claim 8 comprises:
   said piston assembly comprises a head and a control shaft;
   said control shaft being positioned along said central rotation axis of said rotor;
   said control shaft being slidably mounted within said stator;
   said head being rotatably connected around said control shaft;
   said head being fixed along said control shaft;
   an actuation end of said rocket PA lever being positioned external to said stator;
   a fulcrum of said rocket PA lever being hingedly mounted to said stator;
   a linkage end of said rocket PA lever being coupled adjacent to said control shaft; and
   said head and said linkage end of said rocket PA lever being positioned opposite each other along said control shaft.

10. The gyroscopic orbiter with vertical takeoff and vertical landing capabilities as claimed in claim 8 comprises:
    each of said plurality of propelling units further comprises a sleeving channel, a rocket shaft, a rocket pinion gear, and a rocket rack gear;
    said sleeving channel traversing through and along said propeller body;
    said rocket shaft being positioned through said sleeving channel;
    said rocket shaft being rotatably mounted within said propeller body;
    said rocket being connected adjacent to said rocket shaft, exterior to said propeller body;
    said rocket pinion gear being axially aligned around said pitch axis of said rocket;
    said rocket pinion gear being connected adjacent to said rocket shaft, opposite to said rocket and exterior to said propeller body;
    said rocket rack gear being tangentially engaged to said rocket pinion gear; and
    said rocket rack gear being peripherally coupled to a head of said piston assembly, offset from said rocket pinion gear.

11. The gyroscopic orbiter with vertical takeoff and vertical landing capabilities as claimed in claim 3 comprises:
    said front propulsion unit further comprises a catalyst input, an accelerant input, and a first set of annular grooves;
    each of said plurality of propelling units further comprises a second set of annular grooves;
    said first set of annular grooves being positioned around said central rotation axis of said rotor;
    said first set of annular grooves being integrated in between said rotor and said stator;
    said first set of annular grooves being in fluid communication with said catalyst input and said accelerant input;
    said rocket shaft being rotatably mounted within said propeller body;
    said rocket being connected adjacent to said rocket shaft, exterior to said propeller body;
    said second set of annular grooves being positioned around a pitch axis of said rocket;
    said second set of annular grooves being integrated in between said rotor and said rocket shaft;
    said second set of annular grooves being in fluid communication with said first set of annular grooves; and
    said rocket being in fluid communication with said second set of annular grooves.

12. The gyroscopic orbiter with vertical takeoff and vertical landing capabilities as claimed in claim 11 comprises:
said front propulsion unit further comprises a firewall;
said firewall being mounted within said stator, adjacent to said rotor; and
said catalyst input and said accelerant input being mounted adjacent to said firewall, opposite to said rotor.

13. The gyroscopic orbiter with vertical takeoff and vertical landing capabilities as claimed in claim 1 comprises:
a front proximal locking mechanism;
a front distal locking mechanism;
said front proximal locking mechanism being operatively integrated into said front proximal hinge joint, wherein said front proximal locking mechanism is able to selectively slow or stop rotation of said front boom about said front proximal hinge joint; and
said front distal locking mechanism being operatively integrated into said front distal hinge joint, wherein said front distal locking mechanism is able to selectively slow or stop rotation of said front propulsion unit about said front distal hinge joint.

14. The gyroscopic orbiter with vertical takeoff and vertical landing capabilities as claimed in claim 1 comprises:
a front stabilizer rod;
said front stabilizer rod comprises a proximal rod end and a distal rod end;
said proximal rod end being hingedly connected to said fuselage, adjacent to said front proximal hinge joint; and
said distal rod end being hingedly connected to said fuselage, adjacent to said front distal hinge joint.

15. The gyroscopic orbiter with vertical takeoff and vertical landing capabilities as claimed in claim 1 comprises:
a rear boom;
a rear propulsion unit;
a rear proximal hinge joint;
a rear distal hinge joint;
said rear boom being mounted adjacent to said stern by said rear proximal hinge joint;
said rear propulsion unit being mounted adjacent to said rear boom by said rear distal hinge joint; and
said rear proximal hinge joint and said rear distal hinge joint being positioned opposite to each other along said rear boom.

16. The gyroscopic orbiter with vertical takeoff and vertical landing capabilities as claimed in claim 15 comprises:
a pitch axis of said fuselage;
a rotation axis of said rear proximal hinge joint;
a rotation axis of said rear distal hinge joint; and
said rotation axis of said rear proximal hinge joint and said rotation axis of said rear distal hinge joint being positioned parallel to said pitch axis of said fuselage.

17. The gyroscopic orbiter with vertical takeoff and vertical landing capabilities as claimed in claim 15 comprises:
said rear propulsion unit comprises a stator, a rotor, and a plurality of propelling units;
each of said plurality of propelling units comprises a propeller body and a rocket;
said stator being fixed to said rear distal hinge joint;
said rotor being rotatably mounted to said stator;
said plurality of propelling units being radially positioned around a central rotation axis of said rotor;
said propeller body being rotatably and adjacently mounted to said rotor; and
said rocket being rotatably and adjacently mounted to said propeller body, opposite to said rotor.

18. The gyroscopic orbiter with vertical takeoff and vertical landing capabilities as claimed in claim 17 comprises:
said rear propulsion unit further comprises a swash-plate assembly and a propeller control mechanism;
a pitch axis of said propeller body being oriented perpendicular to said central rotation axis of said rotor; and
said propeller control mechanism being operatively coupled to said propeller body for each of said plurality of propelling units through said swash-plate assembly, wherein said propeller control mechanism is used to adjust collective pitch of said plurality of propelling units and is used to adjust cyclic pitch of said propeller body for each of said plurality of propelling units.

19. The gyroscopic orbiter with vertical takeoff and vertical landing capabilities as claimed in claim 18 comprises:
said swash-plate assembly comprises a plate base, a ball-and-socket joint, an inner swash-disc, an outer swash-ring, a plurality of input sockets, and a plurality of output sockets;
said plate base being slidably mounted within said stator;
said plate base and said ball-and-socket joint being positioned along said central rotation axis of said rotor;
said plate base being pivotably and centrally mounted to said inner swash-disc by said ball-and-socket joint;
said outer swash-ring being rotatably mounted around said inner swash-disc;
said plurality of input sockets being peripherally integrated into said inner swash-disc; and
said plurality of output sockets being peripherally integrated into said outer swash-ring.

20. The gyroscopic orbiter with vertical takeoff and vertical landing capabilities as claimed in claim 18 comprises:
said propeller control mechanism comprises a control frame, a collective pitch adjustment (PA) lever, a left-to-right cyclic PA mechanism, and an upper-to-lower cyclic PA mechanism;
said left-to-right cyclic PA mechanism and said upper-to-lower cyclic PA mechanism each comprise a control lever, a first mechanical linkage, and a second mechanical linkage;
said control frame being slidably mounted within said stator;
an actuation end of said collective PA lever being positioned external to said stator;
a fulcrum of said collective PA lever being hingedly mounted to said stator;
a linkage end of said collective PA lever being coupled adjacent to said control frame;
said control lever of said left-to-right cyclic PA mechanism and said control lever of said upper-to-lower cyclic PA mechanism being positioned perpendicular to each other;
a fulcrum of said control lever being hingedly mounted within said control frame;
an actuation end of said first mechanical linkage being hingedly connected to said control lever;
an actuation end of said second mechanical linkage being hingedly connected to said control lever;

said fulcrum of said control lever being positioned in between said actuation end of said first mechanical linkage and said actuation end of said second mechanical linkage; and a ball-shaped end of said first mechanical linkage and a ball-shaped end of said second mechanical linkage being pivotably engaged to a corresponding pair of opposing input sockets from said swash-plate assembly.

21. The gyroscopic orbiter with vertical takeoff and vertical landing capabilities as claimed in claim 18 comprises:

each of said plurality of propelling units further comprises a propeller pinion gear, a propeller rack gear, and a ball insert;

said propeller pinion gear being connected around said propeller body, adjacent to said rotor;

said propeller pinion gear being axially aligned around said pitch axis of said propeller body;

said propeller rack gear being tangentially engaged to said propeller pinion gear;

said ball insert being connected adjacent to said propeller rack gear, offset from said propeller pinion gear; and said ball insert being pivotably engaged to a corresponding output socket from said swash-plate assembly.

22. The gyroscopic orbiter with vertical takeoff and vertical landing capabilities as claimed in claim 17 comprises:

said rear propulsion unit further comprises a piston assembly and a rocket PA lever;

a pitch axis of said rocket being oriented perpendicular to said central rotation axis of said rotor; and said rocket PA lever being operatively coupled to said rocket for each of said plurality of propelling units through said piston assembly, wherein said rocket PA lever is used to adjust pitch for said rocket on each of said plurality of propelling units.

23. The gyroscopic orbiter with vertical takeoff and vertical landing capabilities as claimed in claim 22 comprises:

said piston assembly comprises a head and a control shaft;

said control shaft being positioned along said central rotation axis of said rotor;

said control shaft being slidably mounted within said stator;

said head being rotatably connected around said control shaft;

said head being fixed along said control shaft;

an actuation end of said rocket PA lever being positioned external to said stator;

a fulcrum of said rocket PA lever being hingedly mounted to said stator;

a linkage end of said rocket PA lever being coupled adjacent to said control shaft; and said head and said linkage end of said rocket PA lever being positioned opposite each other along said control shaft.

24. The gyroscopic orbiter with vertical takeoff and vertical landing capabilities as claimed in claim 22 comprises:

each of said plurality of propelling units further comprises a sleeving channel, a rocket shaft, a rocket pinion gear, and a rocket rack gear;

said sleeving channel traversing through and along said propeller body;

said rocket shaft being positioned through said sleeving channel;

said rocket shaft being rotatably mounted within said propeller body;

said rocket being connected adjacent to said rocket shaft, exterior to said propeller body;

said rocket pinion gear being axially aligned around said pitch axis of said rocket;

said rocket pinion gear being connected adjacent to said rocket shaft, opposite to said rocket and exterior to said propeller body;

said rocket rack gear being tangentially engaged to said propeller pinion gear; and said rocket rack gear being peripherally coupled to a head of said piston assembly, offset from said rocket pinion gear.

25. The gyroscopic orbiter with vertical takeoff and vertical landing capabilities as claimed in claim 15 comprises:

said rear propulsion unit further comprises a catalyst input, an accelerant input, and a first set of annular grooves;

each of said plurality of propelling units further comprises a second set of annular grooves;

said first set of annular grooves being positioned around said central rotation axis of said rotor;

said first set of annular grooves being integrated in between said rotor and said stator;

said first set of annular grooves being in fluid communication with said catalyst input and said accelerant input;

said rocket shaft being rotatably mounted within said propeller body;

said rocket being connected adjacent to said rocket shaft, exterior to said propeller body;

said second set of annular grooves being positioned around a pitch axis of said rocket;

said second set of annular grooves being integrated in between said rotor and said rocket shaft;

said second set of annular grooves being in fluid communication with said first set of annular grooves; and said rocket being in fluid communication with said second set of annular grooves.

26. The gyroscopic orbiter with vertical takeoff and vertical landing capabilities as claimed in claim 25 comprises:

said rear propulsion unit further comprises a firewall;

said firewall being mounted within said stator, adjacent to said rotor; and said catalyst input and said accelerant input being mounted adjacent to said firewall, opposite to said rotor.

27. The gyroscopic orbiter with vertical takeoff and vertical landing capabilities as claimed in claim 15 comprises:

a rear proximal locking mechanism;

a rear distal locking mechanism;

said rear proximal locking mechanism being operatively integrated into said rear proximal hinge joint, wherein said rear proximal locking mechanism selectively prevents rotation of said rear boom about said rear proximal hinge joint; and said rear distal locking mechanism being operatively integrated into said rear distal hinge joint, wherein said rear distal locking mechanism selectively prevents rotation of said rear propulsion unit about said rear distal hinge joint.

28. The gyroscopic orbiter with vertical takeoff and vertical landing capabilities as claimed in claim 15 comprises:

a rear stabilizer rod;

said rear stabilizer rod comprises a proximal rod end and a distal rod end;

said proximal rod end being hingedly connected to said fuselage, adjacent to said rear proximal hinge joint; and said distal rod end being hingedly connected to said fuselage, adjacent to said rear distal hinge joint.

29. The gyroscopic orbiter with vertical takeoff and vertical landing capabilities as claimed in claim 15 comprises:

wherein said front propulsion unit, said fuselage, and said rear propulsion unit being aligned in a vertical takeoff or landing (VTOL) mode; and a central rotation axis for a rotor of said front propulsion unit and a central rotation axis for a rotor of said rear propulsion unit being oriented parallel to each other.

30. The gyroscopic orbiter with vertical takeoff and vertical landing capabilities as claimed in claim 15 comprises:

wherein said front propulsion unit, said fuselage, and said rear propulsion unit being aligned in a shuttle mode; and a central rotation axis for a rotor of said rear propulsion unit being oriented at an angle with a central rotation axis for a rotor of said front propulsion unit, wherein said angle is greater than or equal to 90 degrees.

31. The gyroscopic orbiter with vertical takeoff and vertical landing capabilities as claimed in claim 15 comprises:

wherein said front propulsion unit, said fuselage, and said rear propulsion unit being aligned in a high speed mode; and a central rotation axis for a rotor of said front propulsion unit and a central rotation axis for a rotor of said rear propulsion unit being oriented collinear with a roll axis of said fuselage.

* * * * *